(12) United States Patent
Nagatsuka et al.

(10) Patent No.: US 12,331,415 B2
(45) Date of Patent: Jun. 17, 2025

(54) ORGANIC HYDRIDE GENERATION SYSTEM, CONTROL DEVICE FOR ORGANIC HYDRIDE GENERATION SYSTEM, AND CONTROL METHOD FOR ORGANIC HYDRIDE GENERATION SYSTEM

(71) Applicant: ENEOS Corporation, Tokyo (JP)

(72) Inventors: Tomomi Nagatsuka, Tokyo (JP); Yoshitatsu Misu, Tokyo (JP); Koji Matsuoka, Tokyo (JP); Yasushi Sato, Tokyo (JP)

(73) Assignee: ENEOS Corporation, Tokyo (JP)

( * ) Notice: Subject to any disclaimer, the term of this patent is extended or adjusted under 35 U.S.C. 154(b) by 304 days.

(21) Appl. No.: 17/783,354

(22) PCT Filed: Nov. 18, 2020

(86) PCT No.: PCT/JP2020/042955
§ 371 (c)(1),
(2) Date: Jun. 8, 2022

(87) PCT Pub. No.: WO2021/131416
PCT Pub. Date: Jul. 1, 2021

(65) Prior Publication Data
US 2023/0014927 A1    Jan. 19, 2023

(30) Foreign Application Priority Data

Dec. 26, 2019    (JP) .................................. 2019-236642

(51) Int. Cl.
*C25B 9/65*    (2021.01)
*C25B 3/25*    (2021.01)
(Continued)

(52) U.S. Cl.
CPC ................ *C25B 9/65* (2021.01); *C25B 3/25* (2021.01); *C25B 9/19* (2021.01); *C25B 15/023* (2021.01)

(58) Field of Classification Search
CPC ....................................................... C25B 3/25
See application file for complete search history.

(56) References Cited

U.S. PATENT DOCUMENTS

2013/0313127 A1    11/2013   Sato et al.
2014/0363351 A1    12/2014   Sugimasa
(Continued)

FOREIGN PATENT DOCUMENTS

CN    107075700 A    8/2017
CN    110023543 A    7/2019
(Continued)

OTHER PUBLICATIONS

Matsuoka et al., Original and Machine Translation, JP 2019167579 A (Year: 2019).*
(Continued)

*Primary Examiner* — Hosung Chung
(74) *Attorney, Agent, or Firm* — BUCHANAN, INGERSOLL & ROONEY PC

(57) ABSTRACT

An organic hydride generation system includes an electrolytic bath, a main power supplier, an auxiliary power supplier, a detector to detect a voltage of the electrolytic bath, a potential of an anode electrode, or a potential of a cathode electrode, and a controller to control the supply of power to the electrolytic bath. When it is detected that the voltage or the potential has changed to a specified value during operation stop of the organic hydride generation system in which the power from the main power supplier is not supplied to
(Continued)

the electrolytic bath, the controller controls the auxiliary power supplier so as to supply the power to the electrolytic bath.

10 Claims, 3 Drawing Sheets

(51) Int. Cl.
    *C25B 9/19*     (2021.01)
    *C25B 15/023*     (2021.01)

(56) References Cited

U.S. PATENT DOCUMENTS

2017/0314145 A1* 11/2017 Mitsushima .............. C25B 9/73
2020/0002823 A1    1/2020 Ono et al.

FOREIGN PATENT DOCUMENTS

| | | |
|---|---|---|
| JP | 2016098410 A | 5/2016 |
| JP | 2019019379 A | 2/2019 |
| JP | 2019167579 A | 10/2019 |
| WO | 2012091128 A1 | 7/2012 |
| WO | 2013031502 A1 | 3/2013 |
| WO | 2019181003 A1 | 9/2019 |

OTHER PUBLICATIONS

Office Action (Patent Examination Report No. 1) issued on Jun. 7, 2023, in corresponding Australian Patent Application No. 2020412986. (3 pages).
Extended European Search Report issued on Jul. 2, 2024, in corresponding European Patent Application No. 20906949.1. (5 pages).
Chinese Office Action issued CN Application No. 202080084271.3; Mailed Mar. 22, 2023. 9 Pages (with English Translation).
Office Action (Patent Examination Report No. 2) issued on Sep. 14, 2023, in corresponding Australian Patent Application No. 2020412986. (3 pages).
International Preliminary Report on Patentability Chapter I (PCT/IB/373) with translation mailed on Jul. 7, 2022 by the International Bureau of WIPO in corresponding International Patent Application No. PCT/2020/042955. (13 pages).
International Search Report (PCT/ISA/210) with translation mailed on Jan. 26, 2021, by the Japan Patent Office as the International Searching Authority for International Application No. PCT/JP2020/042955. (5 pages).

* cited by examiner

ORGANIC HYDRIDE GENERATION SYSTEM, CONTROL DEVICE FOR ORGANIC HYDRIDE GENERATION SYSTEM, AND CONTROL METHOD FOR ORGANIC HYDRIDE GENERATION SYSTEM

CROSS-REFERENCE TO RELATED APPLICATIONS

This application is based upon and claims the benefit of priority from the prior Japanese Patent Application No. 2019-236642, filed on Dec. 26, 2019, and International Patent Application No. PCT/JP2020/042955, filed on Nov. 18, 2020, the entire content of each of which is incorporated herein by reference.

BACKGROUND

Field of the Invention

The present invention relates to an organic hydride generation system, a control device for an organic hydride generation system, and a control method for an organic hydride generation system.

Description of the Related Art

Conventionally, an organic hydride generation device including an anode for generating protons from water and a cathode for hydrogenating an organic compound having an unsaturated bond is known (for example, refer to Patent Literature 1). In the organic hydride generation device, water is supplied to the anode, a hydrogenation target substance is supplied to the cathode, and a current is flown between the anode and the cathode, so that hydrogen is added to the hydrogenation target substance to obtain an organic hydride.

Patent Literature 1: WO 2012/091128 A

In recent years, renewable energy obtained by wind power, sunlight, or the like has attracted attention as energy capable of suppressing carbon dioxide emission in a generation process as compared with energy obtained by thermal power generation. In response to this, development of a system using renewable energy as a power supply of the above-described organic hydride generation device is in progress. However, in a power generator using wind power or sunlight, the output changes frequently, and the output becomes zero depending on no wind or weather. Therefore, when the power generator using wind power or sunlight is used as the power supply of the organic hydride generation device, the device is frequently stopped and started repeatedly.

On the other hand, in the organic hydride generation device, when the power supply is stopped, a reverse current is generated in an electrochemical cell, so that an electrode may be deteriorated. In addition, the electrode may be deteriorated during stop of the power supply due to gas crossover (cross leakage) between both poles. Therefore, it is necessary to suppress deterioration of the electrode due to the stop of the organic hydride generation device that irregularly occurs.

However, problems in a system for generating an organic hydride by a combination of the renewable energy and the organic hydride generation device have not been sufficiently studied. As a result of intensive studies to realize realistic generation of an organic hydride by combining the renewable energy and the organic hydride generation device, the present inventors have arrived at technology for suppressing deterioration of the electrode due to a large number of power supply stops of the renewable energy and further improving durability of an organic hydride generation system.

SUMMARY OF THE INVENTION

The present invention has been made in view of such a situation, and an object thereof is to provide technology for improving durability of an organic hydride generation system.

One aspect of the present invention is an organic hydride generation system. This system includes: an electrolytic bath having an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber; a main power supplier structured to supply power to the electrolytic bath; an auxiliary power supplier structured to supply power to the electrolytic bath independently of the main power supplier; a detector structured to detect a voltage between the anode electrode and the cathode electrode, a potential of the anode electrode, or a potential of the cathode electrode; and a controller structured to control the supply of power to the electrolytic bath on the basis of a detection result of the detector. The controller controls the auxiliary power supplier so as to supply the power to the electrolytic bath, when it is detected that the voltage has decreased to a specified voltage, the potential of the anode electrode has changed to a specified potential $E_{AN1}$, or the potential of the cathode electrode has changed to a specified potential $E_{CA1}$ during operation stop of the organic hydride generation system in which the power from the main power supplier is not supplied to the electrolytic bath.

Another aspect of the present invention is a control device for an organic hydride generation system. This control device is a control device for an organic hydride generation system, which includes an electrolytic bath having an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber and in which power is supplied from a main power supplier and an auxiliary power supplier supplying the power independently of the main power supplier to the electrolytic bath. The control device controls the auxiliary power supplier so as to supply the power to the electrolytic bath, when it is detected that a voltage between the anode electrode and the cathode electrode has decreased to a specified voltage, a potential of the anode electrode has changed to a specified potential $E_{AN1}$, or a potential of the cathode electrode has changed to a specified potential $E_{CA1}$ during operation stop of the organic hydride generation system in which the power from the main power supplier is not supplied to the electrolytic bath.

Other aspect of the present invention is a control method for an organic hydride generation system. This control method is a control method for an organic hydride generation system, which includes an electrolytic bath having an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber and in which power is supplied from a main power supplier and an auxiliary power supplier supplying the power independently of the main power supplier to the electrolytic bath. The control method includes: detecting a voltage between the anode electrode and the cathode electrode, a potential of the anode electrode, or a potential of the cathode electrode; and controlling the auxiliary power supplier so as to supply the power to the electrolytic bath, when it is detected that the voltage has decreased to a specified voltage, the potential of the anode electrode has changed to a specified potential $E_{AN1}$, or the potential of the cathode electrode has changed to a specified potential $E_{CA1}$ during operation stop of the organic hydride generation system in which the power from the main power supplier is not supplied to the electrolytic bath.

Arbitrary combinations of the above components and conversions of an expression of the present disclosure between a method, a device, a system, and the like are also effective as aspects of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
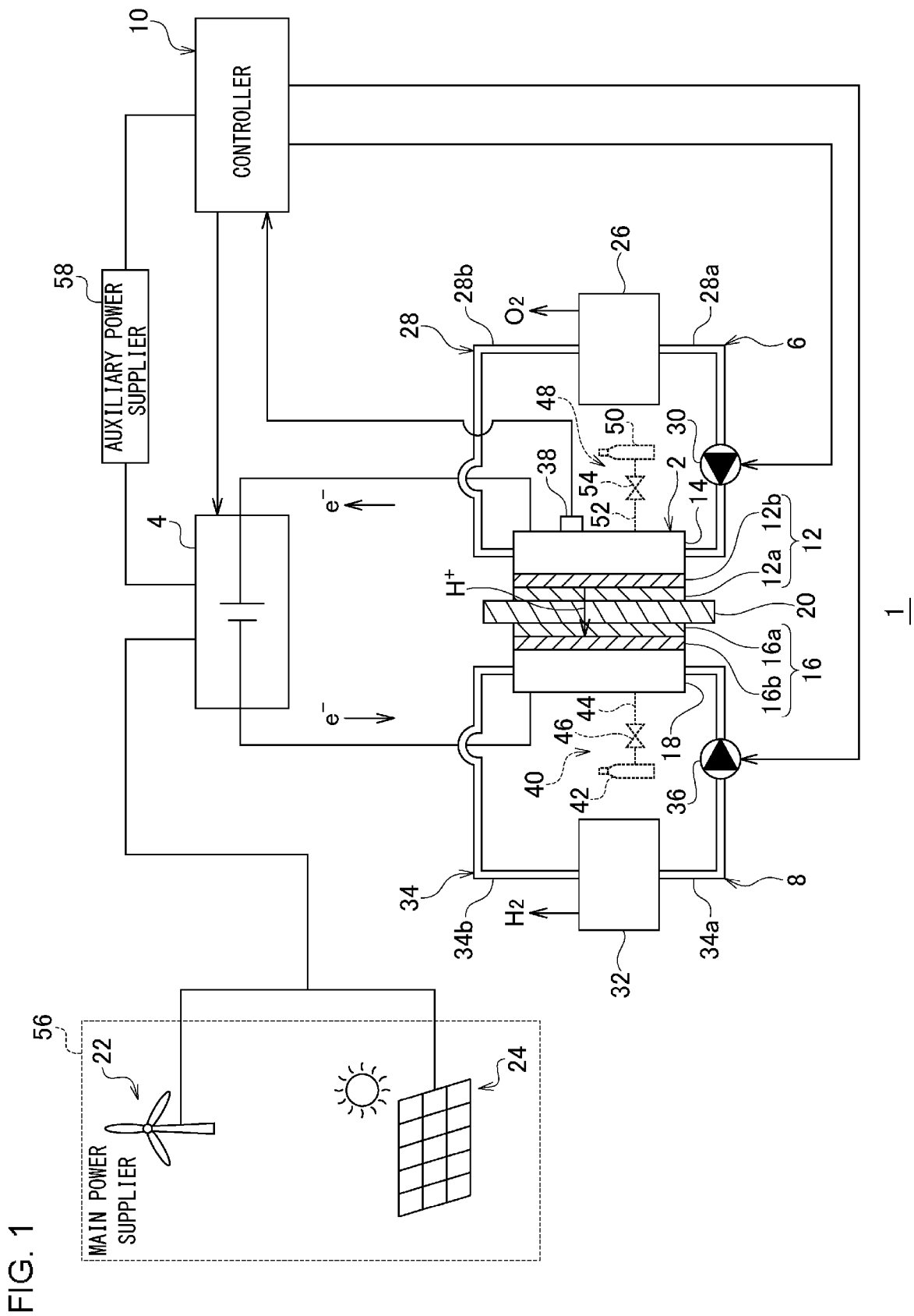
FIG. 1 is a schematic diagram of an organic hydride generation system according to an embodiment.

Hereinafter, the present invention will be described on the basis of preferred embodiments while referring to the drawings. The embodiments do not limit the invention, but are exemplary, and all features and combinations thereof described in the embodiments are not necessarily essential to the invention. The same or equivalent components, members, and processes illustrated in the drawings will be denoted by the same reference numerals, and repeated description will be omitted as appropriate.

In addition, the scale and shape of each part illustrated in the drawings are set conveniently in order to facilitate the description, and are not limitedly interpreted unless otherwise specified. In addition, when the terms "first", "second", and the like are used in the present specification or claims, the terms do not represent any order or importance, but are used to distinguish one configuration from another configuration. In addition, in the drawings, some of members that are not important for describing the embodiments will be omitted.

FIG. 1 is a schematic diagram of an organic hydride generation system according to an embodiment. An organic hydride generation system 1 includes an electrolytic bath 2, a power supply 4, a first circulation mechanism 6, a second circulation mechanism 8, a controller 10, a detector 38, a main power supplier 56, and an auxiliary power supplier 58.

The electrolytic bath 2 is an electrolysis cell for generating an organic hydride by hydrogenating a hydrogenation target substance which is a dehydrogenated product of the organic hydride by an electrochemical reduction reaction. The electrolytic bath 2 has an anode electrode 12, an anode chamber 14, a cathode electrode 16, a cathode chamber 18, and a diaphragm 20.

The anode electrode 12 (anode) oxidizes water to generate protons. The anode electrode 12 has a catalyst layer 12a and a gas diffusion layer 12b. The catalyst layer 12a contains, for example, iridium (Ir) or platinum (Pt) as a catalyst. Note that the catalyst layer 12a may contain other metals or metal compounds. The catalyst layer 12a is disposed so as to be in contact with one main surface of the diaphragm 20. The gas diffusion layer 12b is formed of a conductive porous body or the like. As a material forming the gas diffusion layer 12b, a known material can be used. The anode electrode 12 is accommodated in the anode chamber 14. A space excluding the anode electrode 12 in the anode chamber 14 forms a flow path of water and oxygen generated by an electrode reaction.

The cathode electrode 16 (cathode) hydrogenates a hydrogenation target substance with protons to generate an organic hydride. The cathode electrode 16 has a catalyst layer 16a and a gas diffusion layer 16b. The catalyst layer 16a contains, for example, platinum (Pt) or ruthenium (Ru) as a catalyst. Note that the catalyst layer 16a may contain other metals or metal compounds. The catalyst layer 16a is disposed so as to be in contact with the other main surface of the diaphragm 20. The gas diffusion layer 16b is formed of a conductive porous body or the like. As a material forming the gas diffusion layer 16b, a known material can be used. The cathode electrode 16 is accommodated in the cathode chamber 18. A space excluding the cathode electrode 16 in the cathode chamber 18 forms a flow path of the hydrogenation target substance and the organic hydride generated by the electrode reaction.

The anode chamber 14 and the cathode chamber 18 are partitioned by the diaphragm 20. The diaphragm 20 is disposed between the anode electrode 12 and the cathode electrode 16. The diaphragm 20 of the present embodiment is formed of a solid polymer electrolyte membrane having proton conductivity. The solid polymer electrolyte membrane is not particularly limited as long as it is a material through which protons ($H^+$) conduct, and examples thereof include a fluorine-based ion exchange membrane having a sulfonate group.

A reaction that occurs when toluene (TL) is used as an example of the hydrogenation target substance in the electrolytic bath 2 is as follows. When toluene is used as the hydrogenation target substance, the obtained organic hydride is methylcyclohexane (MCH).

Electrode reaction at anode(positive electrode):
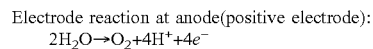

Electrode reaction at cathode(negative electrode):

In the anode electrode 12, water is electrolyzed to generate oxygen gas, protons, and electrons. The protons move through the diaphragm 20 toward the cathode electrode 16. The electrons flow into a positive electrode of the power supply 4. The oxygen gas is discharged to the outside through the anode chamber 14. In the cathode electrode 16, methylcyclohexane is generated by the reaction of toluene, electrons supplied from a negative electrode of the power supply 4, and protons having moved through the diaphragm 20.

Further, in the cathode electrode 16, the following side reaction occurs.

As a concentration of the hydrogenation target substance supplied to the cathode electrode 16 decreases, this side reaction is more likely to occur. The hydrogen gas generated by the side reaction is discharged to the outside through the cathode chamber 18.

The power supply 4 is a DC power supply that supplies power to the electrolytic bath 2. When power is supplied from the power supply 4, a predetermined electrolytic voltage is applied between the anode electrode 12 and the cathode electrode 16 of the electrolytic bath 2.

The power supply 4 receives power supplied from the main power supplier 56 and the auxiliary power supplier 58, and supplies power to the electrolytic bath 2. For example, when power is input as AC from each power supplier, the power supply 4 first performs voltage conversion by a transformer, then performs rectification by a bridge diode, further performs smoothing by a smoothing electrolytic capacitor, and finally supplies power from an output terminal to the electrolytic bath 2.

The main power supplier 56 can include a wind power generation device 22, a solar power generation device 24, or the like that generates power derived from renewable energy. Note that the main power supplier 56 is not limited to the power generation device that generates power derived from the renewable energy. The organic hydride generation system 1 is in operation when power from the main power supplier 56, that is, power generated by the main power supplier 56 is supplied to the electrolytic bath 2, and is in operation stop when power from the main power supplier 56 is not supplied to the electrolytic bath 2. The "operation" mentioned herein means generation of an organic hydride which is a main purpose of the organic hydride generation system 1. Therefore, even when the operation of the organic hydride generation system 1 is stopped, power supply and the like from the auxiliary power supplier 58 can be performed.

The "power from the main power supplier 56 is not supplied to the electrolytic bath 2" means that, for example, a voltage state of the electrolytic bath 2 obtained by power supplied from only the main power supplier 56 is a voltage state smaller than a theoretical electrolytic voltage. This state also includes a case where power supplied from the main power supplier 56 to the power supply 4 and the electrolytic bath 2 is zero. The "theoretical electrolytic voltage" is a voltage calculated from a difference between an oxidation-reduction potential based on Gibbs free energy ($\Delta G$) in a generation reaction (cathode reaction) of an organic hydride by hydrogenation of a hydrogenation target substance and an oxidation-reduction potential based on $\Delta G$ in an oxygen generation reaction (anode reaction) by decomposition of water. Specifically, when the hydrogenation target substance is toluene, the oxidation-reduction potential in the cathode reaction is 0.15 V based on $\Delta G$. In addition, the oxidation-reduction potential in the anode reaction is 1.23 V based on $\Delta G$. As a result, the theoretical electrolytic voltage is 1.08 V. Therefore, a state in which the voltage applied to the electrolytic bath 2 by the power supply from the main power supplier 56 is less than 1.08 V is the state in which "power is not supplied".

During the operation stop of the organic hydride generation system 1, power from the main power supplier 56 is not sufficiently supplied to the electrolytic bath 2. For this reason, a sufficient positive current to cause electrolysis does not flow to the electrolytic bath 2, or a reverse current flows (excluding the time of power supply from the auxiliary power supplier 58). An electrical state of the electrolytic bath 2 when the organic hydride generation system 1 is in operation stop also includes a state in which a voltage is applied to the electrolytic bath 2 but a positive current does not flow. Further, the electrical state of the electrolytic bath 2 when the organic hydride generation system 1 is in operation stop includes a state in which a slight positive current flows to such an extent that a potential change of an electrode caused by cross leakage to be described later cannot be suppressed.

The auxiliary power supplier 58 can supply power to the power supply 4 independently of the main power supplier 56. The auxiliary power supplier 58 can be configured by, for example, a storage battery, system power, or the like. When the auxiliary power supplier 58 includes the storage battery, the auxiliary power supplier 58 may be charged by receiving power supplied from the main power supplier 56. As a result, it is possible to suppress carbon dioxide emission associated with the realization of the organic hydride generation system 1, as compared with the case where the auxiliary power supplier 58 is configured by the system power. As described later, the auxiliary power supplier 58 can supply power to the power supply 4 while the operation of the organic hydride generation system 1 is stopped on the basis of the control by the controller 10.

The first circulation mechanism 6 circulates water in the anode chamber 14. The first circulation mechanism 6 has a first circulation tank 26, a first circulation path 28, and a first circulation device 30. The first circulation tank 26 stores water to be supplied to the anode chamber 14. The water in the present embodiment may be a solution having predetermined ion conductivity, such as a sulfuric acid aqueous solution, a nitric acid aqueous solution, or a hydrochloric acid aqueous solution, pure water, or ion-exchanged water. Hereinafter, the liquid stored in the first circulation tank 26 is appropriately referred to as an anolyte.

The first circulation tank 26 and the anode chamber 14 are connected by the first circulation path 28. The first circulation path 28 has a forward path 28a for supplying the anolyte from the first circulation tank 26 to the anode chamber 14, and a return path 28b for recovering the anolyte from the anode chamber 14 to the first circulation tank 26. The first circulation device 30 is provided, for example, in the middle of the forward path 28a. By driving the first circulation device 30, the anolyte flows in the first circulation path 28 and circulates between the first circulation tank 26 and the anode chamber 14. As the first circulation device 30, for example, various pumps such as a gear pump and a cylinder pump, a natural flow-down type device, or the like can be used.

The first circulation tank 26 also functions as a gas-liquid separator. In the anode electrode 12, oxygen is generated by an electrode reaction. Therefore, the anolyte recovered from the anode chamber 14 contains gaseous oxygen and dissolved oxygen. The gaseous oxygen is separated from the anolyte in the first circulation tank 26 and taken out of the system. The anolyte from which the oxygen has been separated is supplied to the electrolytic bath 2 again.

The second circulation mechanism 8 circulates the hydrogenation target substance in the cathode chamber 18. The second circulation mechanism 8 has a second circulation tank 32, a second circulation path 34, and a second circulation device 36. The second circulation tank 32 stores the hydrogenation target substance to be supplied to the cathode electrode 16. The hydrogenation target substance is a compound that is hydrogenated by an electrochemical reduction reaction in the electrolytic bath 2 to become an organic hydride, in other words, a dehydrogenated product of the organic hydride. The hydrogenation target substance is preferably a liquid at 20° C. and 1 atm. In the second circulation tank 32, not only the hydrogenation target substance but also the organic hydride generated in the cathode electrode 16 is recovered. Hereinafter, the liquid stored in the second circulation tank 32 is appropriately referred to as a catholyte.

The hydrogenation target substance and the organic hydride used in the present embodiment are not particularly limited as long as they are organic compounds capable of adding/desorbing hydrogen by reversibly causing a hydrogenation reaction/dehydrogenation reaction, and can be widely used, for example, acetone-isopropanol systems, benzoquinone-hydroquinone systems, and aromatic hydrocarbon systems. Among them, aromatic hydrocarbon systems represented by toluene-methylcyclohexane systems are preferable from the viewpoint of transportability at the time of energy transport.

The aromatic hydrocarbon compound used as the hydrogenation target substance is a compound containing at least one aromatic ring, and examples thereof include benzene, alkylbenzene, naphthalene, alkylnaphthalene, anthracene, and diphenylethane. The alkylbenzene contains a compound in which 1 to 4 hydrogen atoms of an aromatic ring are substituted with a linear alkyl group or a branched alkyl group having 1 to 6 carbons, and examples thereof include toluene, xylene, mesitylene, ethylbenzene, and diethylbenzene. The alkylnaphthalene contains a compound in which 1 to 4 hydrogen atoms of an aromatic ring are substituted with a linear alkyl group or a branched alkyl group having 1 to 6 carbons, and examples thereof include methylnaphthalene. These may be used alone or in combination.

The hydrogenation target substance is preferably at least one of toluene and benzene. Note that nitrogen-containing heterocyclic aromatic compounds such as pyridine, pyrimidine, pyrazine, quinoline, isoquinoline, N-alkylpyrrole, N-alkylindole, and N-alkyldibenzopyrrole can also be used as hydrogenation target substances. The organic hydride is obtained by hydrogenating the above-mentioned hydrogenation target substance, and examples thereof include cyclohexane, methylcyclohexane, dimethylcyclohexane, and piperidine.

The second circulation tank 32 and the cathode chamber 18 are connected by the second circulation path 34. The second circulation path 34 has a forward path 34a for supplying the catholyte from the second circulation tank 32 to the cathode chamber 18, and a return path 34b for recovering the catholyte from the cathode chamber 18 to the second circulation tank 32. The second circulation device 36 is provided, for example, in the middle of the forward path 34a. By driving the second circulation device 36, the catholyte flows in the second circulation path 34 and circulates between the second circulation tank 32 and the cathode chamber 18. As the second circulation device 36, for example, various pumps such as a gear pump and a cylinder pump, a natural flow-down type device, or the like can be used.

The second circulation tank 32 also functions as a gas-liquid separator. In the cathode electrode 16, hydrogen is generated by a side reaction. Therefore, the catholyte recovered from the cathode chamber 18 contains gaseous hydrogen and dissolved hydrogen. The gaseous hydrogen is separated from the catholyte in the second circulation tank 32 and taken out of the system. The catholyte from which hydrogen has been separated is supplied to the electrolytic bath 2 again.

The controller 10 is a control device that controls the supply of power to the electrolytic bath 2. The potentials of the anode electrode 12 and the cathode electrode 16 are controlled by the controller 10. The controller 10 is realized by an element or a circuit such as a CPU or a memory of a computer as a hardware configuration, and is realized by a computer program or the like as a software configuration, but is illustrated as a functional block realized by cooperation between them in FIG. 1. It should be understood by those skilled in the art that the functional blocks can be implemented in various forms by a combination of hardware and software.

A signal indicating the voltage between the anode electrode 12 and the cathode electrode 16 (in other words, the voltage of the electrolytic bath 2), the potential of the anode electrode 12, or the potential of the cathode electrode 16 is input from the detector 38 provided in the electrolytic bath 2 to the controller 10. The detector 38 can detect the potential of each electrode and the voltage of the electrolytic bath 2 by a known method. The detector 38 includes, for example, a known voltmeter.

For example, when the detector 38 detects the potential of the anode electrode 12 or the potential of the cathode electrode 16, a reference electrode is provided in the diaphragm 20. The reference electrode is held at the reference electrode potential. For example, the reference electrode is a reversible hydrogen electrode (RHE). One terminal of the detector 38 is connected to the reference electrode, the other terminal is connected to an electrode to be detected, and the potential of the electrode with respect to the reference electrode is detected. In addition, when the detector 38 detects the voltage of the electrolytic bath 2, one terminal of the detector 38 is connected to the anode electrode 12, the other terminal is connected to the cathode electrode 16, and a potential difference between both the electrodes, that is, the voltage is detected. When the detector 38 detects the voltage, the reference electrode can be omitted. The detector 38 transmits a detection result to the controller 10. Note that FIG. 1 schematically illustrates the detector 38.

In addition, the detector 38 includes a current detector that detects a current flowing between the anode electrode 12 and the cathode electrode 16. The current detector includes, for example, a known ammeter. A current value detected by the current detector is input to the controller 10.

The controller 10 controls the output of the power supply 4, the drive of the first circulation device 30 and the second circulation device 36, and the like during the operation of the organic hydride generation system 1, on the basis of the detection result of the detector 38. Further, the controller 10 controls the power supply 4, the first circulation device 30, the second circulation device 36, the auxiliary power supplier 58, and the like when the operation of the organic hydride generation system 1 is stopped or during the operation stop.

Although only one electrolytic bath 2 is illustrated in FIG. 1, the organic hydride generation system 1 may have a plurality of electrolytic baths 2. In this case, the respective electrolytic baths 2 are arranged in the same direction such that the anode chamber 14 and the cathode chamber 18 are arranged in the same direction, and are stacked with an electric conduction plate interposed between the adjacent electrolytic baths 2. As a result, the electrolytic baths 2 are electrically connected in series. The electric conduction plate is made of a conductive material such as a metal. Note that the electrolytic baths 2 may be connected in parallel, or may be a combination of series connection and parallel connection.

[Cause of Potential Change Occurring During Operation Stop]

When the operation of the organic hydride generation system 1 is stopped and the supply of power from the power supply 4 to the electrolytic bath 2 is stopped, gas crossover may occur via the diaphragm 20. Specifically, a part of the oxygen gas generated at the anode electrode 12 passes through the diaphragm 20 and moves to the side of the cathode electrode 16. In addition, a part of the hydrogen gas generated by the side reaction in the cathode electrode 16 passes through the diaphragm 20 and moves to the side of the anode electrode 12.

When the gas crossover occurs, in the anode electrode 12, the remaining oxygen gas reacts with the hydrogen gas moving from the side of the cathode electrode 16, and water is generated. Similarly, in the cathode electrode 16, the remaining hydrogen gas reacts with the oxygen gas moving from the side of the anode electrode 12, and water is generated. Note that since the oxidation reaction of the organic hydride generated in the cathode electrode 16 hardly occurs, the organic hydride does not function as a reducing agent. Therefore, on the side of the cathode electrode 16, only hydrogen gas to be a by-product functions as a reducing agent.

When the plurality of electrolytic baths 2 are stacked and the electrolytic baths 2 are connected by the first circulation path 28, a reverse current may flow. For example, when the operation of the organic hydride generation system 1 is stopped, a potential difference occurs between the reduction reaction of oxygen at the anode electrode 12 and the oxidation reaction of by-product hydrogen at the cathode electrode 16. This potential difference is used as an electromotive force, and a current in a direction opposite to that during electrolysis, that is, a reverse current may flow through a circulation path or the like of the anolyte as a path. As a result, the following reverse reaction can occur in the electrolytic bath 2.

Reaction at anode after electrolysis stop: $O_2+4H^++4e^-\rightarrow 2H_2O$

Reaction at cathode after electrolysis stop: $2H_2\rightarrow 4H^++4e^-$

Note that even in the generation of the reverse current, only the hydrogen gas generated by the side reaction functions as a reducing agent. In addition, since the hydrogenation target substance such as toluene has no ion conductivity, only the circulation path of the anolyte becomes an ion conduction path.

When the gas crossover or the reverse current occurs, oxygen in the anode chamber 14 and hydrogen in the cathode chamber 18 are consumed in amounts corresponding to equal charge amounts. That is, two molecules of hydrogen are consumed for one molecule of oxygen by the above-described reaction. When oxygen or hydrogen remaining in any of the electrode chambers is consumed and the electric capacity of the electrode is consumed, the potentials of both the electrodes change to the oxidation-reduction potential of the electrode in which oxygen or hydrogen remains at that time. That is, when the operation of the organic hydride generation system 1 is stopped, the potentials of the anode electrode 12 and the cathode electrode 16 change to the potential of the electrode having a larger one of the total amount of the oxidizing agent on the anode side and the total amount of the reducing agent on the cathode side.

The above-described oxidation-reduction potential is a potential at the time of causing a reaction accompanied by a phase change or a valence change of the catalyst included in the electrode. Hereinafter, the oxidation-reduction potential when the catalyst included in the anode electrode 12 causes a reduction reaction accompanied by a phase change or a valence change is appropriately referred to as an oxidation-reduction potential $E_{AN}$. In addition, the oxidation-reduction potential when the catalyst included in the cathode electrode 16 causes an oxidation reaction accompanied by a phase change or a valence change is referred to as an oxidation-reduction potential $E_{CA}$.

The total amount of each of the oxidizing agent on the anode side and the reducing agent on the cathode side can be calculated as follows by conversion into an electricity amount (charge amount).

Total amount(electricity amount)of oxidizing agent=electrode capacity of anode electrode+ number of reaction electrons×Faraday constant× number of moles of oxygen in electrode chamber Total amount(electricity amount)of reducing agent=electrode capacity of cathode electrode+ number of reaction electrons×Faraday constant× number of moles of hydrogen in electrode chamber In the above formula, the number of moles of oxygen is the total number of moles of oxygen dissolved in the anolyte and oxygen in a gas state. Similarly, the number of moles of hydrogen is the total number of moles of hydrogen dissolved in the catholyte and hydrogen in a gas state.

In the electrolytic bath 2 of the present embodiment, the potential of the anode electrode 12 is 1.2 V (vs. RHE) or more and the potential of the cathode electrode 16 is about 0.12 V (vs. RHE) or less during the operation of the organic hydride generation system 1 or immediately after the operation stop of the organic hydride generation system 1. When the gas crossover or the reverse current occurs during the operation stop of the organic hydride generation system 1, the potential of the anode electrode 12 may decrease to the oxidation-reduction potential $E_{AN}$ or less, or the potential of the cathode electrode 16 may increase to the oxidation-reduction potential $E_{CA}$ or more.

When such a change in potential occurs, a valence change, elution, aggregation, and the like of the catalyst occur, and deterioration of the electrode whose potential has changed progresses. When the deterioration of the electrode progresses, the electrolysis overvoltage of the electrolytic bath 2 increases, and the amount of power required to generate the organic hydride of a unit mass increases. When the amount of power required to generate the organic hydride increases and the organic hydride generation efficiency falls below a predetermined value, the electrolytic bath 2 reaches the life end. The standard of the life end due to the deterioration of the electrode is, for example, a case where a voltage (in a case of a current density of 1 A/cm²) during electrolysis of the electrolytic bath 2 increases by 20%.

[Countermeasures Against Electrode Deterioration Caused by Potential Change]

Therefore, in the organic hydride generation system 1 according to the present embodiment, the controller 10 executes control described below to suppress the deterioration of the electrode occurring during the operation stop.

That is, when it is detected that the voltage of the electrolytic bath 2 has decreased to a specified voltage, the potential of the anode electrode 12 has changed to a specified potential $E_{AN1}$, or the potential of the cathode electrode 16 has changed to a specified potential $E_{CA1}$ during the operation stop of the organic hydride generation system 1, the controller 10 controls the auxiliary power supplier 58 and the power supply 4 so as to supply power to the electrolytic bath 2. The controller 10 supplies power from the auxiliary power supplier 58 to the electrolytic bath 2 to cause an electrolytic reaction in the electrolytic bath 2.

For example, when it is detected that the potential of the anode electrode 12 has decreased to the specified potential $E_{AN1}$ that may cause deterioration of the catalyst, or the voltage has decreased to the specified voltage due to the decrease, the controller 10 supplies power from the auxiliary power supplier 58 to perform electrolysis in the electrolytic bath 2 for a short time. Hereinafter, short-time electrolysis performed by supplying power from the auxiliary power supplier 58 to the electrolytic bath 2 during the operation stop of the organic hydride generation system 1 is appropriately referred to as potential recovery electrolysis. By the potential recovery electrolysis, the decreased potential of the anode electrode 12 increases. As a result, the potential of the anode electrode 12 can be temporarily maintained at a value higher than the specified potential $E_{AN1}$. Although the potential of the anode electrode 12 decreases again with the lapse of time, the monitoring of the potential change of the anode electrode 12 or the voltage change of the electrolytic bath 2 and the potential recovery electrolysis are repeated, so that the potential of the anode electrode 12 can be maintained at a value higher than the specified potential $E_{AN1}$ during the operation stop of the organic hydride generation system 1.

In addition, when it is detected that the potential of the cathode electrode 16 has increased to the specified potential $E_{CA1}$ that may cause deterioration of the catalyst, or the voltage has decreased to the specified voltage due to the increase, the controller 10 supplies power from the auxiliary power supplier 58 to perform the potential recovery electrolysis in the electrolytic bath 2. As a result, the increased potential of the cathode electrode 16 decreases. As a result, the potential of the cathode electrode 16 can be temporarily maintained at a value lower than the specified potential $E_{CA1}$. Although the potential of the cathode electrode 16 increases again with the lapse of time, the monitoring of the potential change of the cathode electrode 16 or the voltage change of the electrolytic bath 2 and the potential recovery electrolysis are repeated, so that the potential of the cathode electrode 16 can be maintained at a value lower than the specified potential $E_{CA1}$ during the operation stop of the organic hydride generation system 1.

As described above, during the operation stop of the organic hydride generation system 1, the voltage of the electrolytic bath 2, the potential of the anode electrode 12, or the potential of the cathode electrode 16 is monitored, and the potential recovery electrolysis using power of the auxiliary power supplier 58 is performed according to the change in the voltage or the potential observed by the monitoring, so that the change in the potential of both the electrodes can be controlled. As a result, the deterioration of both the electrodes can be suppressed.

Which one of the potentials of the anode electrode 12 and the cathode electrode 16 changes during the operation stop of the organic hydride generation system 1 is affected by the magnitude of the sum of the charge amount of the anode electrode 12 and the positive charge amount of oxygen present in the anode chamber 14 during the operation stop of the organic hydride generation system 1 and the sum of the charge amount of the cathode electrode 16 and the negative charge amount of hydrogen present in the cathode chamber 18 during the operation stop. For example, which electrode potential changes is affected by the magnitude at the time of stopping the operation of the organic hydride generation system 1.

That is, when a charge amount of the anode electrode 12 is $Q_{AN}$ electrode, a charge amount of the cathode electrode 16 is $Q_{CA}$ electrode, an absolute value of a positive charge amount of oxygen present in the anode chamber 14 is $Q_{AN}$ $O_2$, and an absolute value of a negative charge amount of hydrogen present in the cathode chamber 18 is $Q_{CA}$ $H_2$, the electrolytic bath 2 takes a first state in which $Q_{CA}$ electrode+$Q_{CA}$ $H_2$ is larger than $Q_{AN}$ electrode+$Q_{AN}$ $O_2$ or a second state in which $Q_{AN}$ electrode+$Q_{AN}$ $O_2$ is larger than $Q_{CA}$ electrode+$Q_{CA}$ $H_2$ during the operation stop.

When the electrolytic bath 2 takes the first state during the operation stop of the organic hydride generation system 1, the potential of the anode electrode 12 decreases during the operation stop, and the potential of the cathode electrode 16 is maintained. On the other hand, when the electrolytic bath 2 takes the second state during the operation stop of the organic hydride generation system 1, the potential of the cathode electrode 16 increases during the operation stop, and the potential of the anode electrode 12 is maintained.

When a detection target of the detector 38 is the potential, the detector 38 is set to detect the potential of the anode electrode 12 when the electrolytic bath 2 takes the first state during the operation stop. In addition, the detector 38 is set to detect the potential of the cathode electrode 16 when the electrolytic bath 2 takes the second state during the operation stop. When the detection target of the detector 38 is the anode electrode 12, the specified potential $E_{AN1}$ is determined on the basis of the oxidation-reduction potential $E_{AN}$ of the catalyst included in the anode electrode 12. When the detection target of the detector 38 is the cathode electrode 16, the specified potential $E_{CA1}$ is determined on the basis of the oxidation-reduction potential $E_{CA}$ of the catalyst included in the cathode electrode 16. That is, the specified potential is calculated on the basis of the potential causing a valence change or a phase change obtained from a phase diagram of metal species included in the electrode.

When the potential of the anode electrode 12 is detected, the specified potential $E_{AN1}$ may be the same value as the oxidation-reduction potential $E_{AN}$ of the catalyst included in the anode electrode 12, or may be a value obtained by adding a predetermined margin to the oxidation-reduction potential $E_{AN}$. When the predetermined margin is added, the specified potential $E_{AN1}$ may be a value higher than the oxidation-reduction potential $E_{AN}$ by the margin or may be a value lower than the oxidation-reduction potential $E_{AN}$ by the margin.

For example, when iridium oxide ($IrO_2$) is used as the catalyst of the anode electrode 12, the oxidation-reduction potential $E_{AN}$ is about 0.8 V. The oxidation-reduction potential $E_{AN}$ is a potential when an activity ratio of the oxidant to the reductant is 1:1. Therefore, when the potential of the electrode reaches the oxidation-reduction potential $E_{AN}$ of the catalyst, there is a possibility that a part of the electrode catalyst is already deteriorated. On the other hand, the specified potential $E_{AN1}$ is set to a value higher than the oxidation-reduction potential $E_{AN}$ of the catalyst by the margin, so that deterioration of the anode electrode 12 can be further suppressed. For example, in the case of iridium oxide, the activity ratio of the oxidant to the reductant is 10:1 to 100:1 at a potential of 0.9 V. Therefore, by setting the specified potential $E_{AN1}$ to 0.9 V, deterioration of the electrode catalyst can be further suppressed.

On the other hand, when the specified potential $E_{AN1}$ is set to a value lower than the oxidation-reduction potential $E_{AN}$ of the catalyst by the margin, the number of times of potential recovery electrolysis performed during the operation stop of the organic hydride generation system 1 can be suppressed, and an increase in power consumption can be suppressed.

When the potential of the cathode electrode 16 is detected, the specified potential $E_{CA1}$ may be the same value as the oxidation-reduction potential $E_{CA}$ of the catalyst included in the cathode electrode 16, or may be a value obtained by adding a predetermined margin to the oxidation-reduction potential $E_{CA}$. When the predetermined margin is added, the specified potential $E_{CA1}$ may be a value lower than the oxidation-reduction potential $E_{CA}$ by the margin or may be a value higher than the oxidation-reduction potential $E_{CA}$ by the margin. When the specified potential $E_{CA1}$ is a value lower than the oxidation-reduction potential $E_{CA}$ of the catalyst by the margin, deterioration of the cathode electrode 16 can be further suppressed. When the specified potential $E_{CA1}$ is a value higher than the oxidation-reduction potential $E_{CA}$ of the catalyst by the margin, the number of times of potential recovery electrolysis performed during the operation stop of the organic hydride generation system 1 can be suppressed, and an increase in power consumption can be suppressed.

In a case where the detection target of the detector 38 is a voltage, the specified voltage is determined on the basis of the oxidation-reduction potential $E_{AN}$ of the catalyst included in the anode electrode 12 when the electrolytic bath 2 is in the first state during the operation stop. When the electrolytic bath 2 is in the second state during the operation stop, the specified voltage is determined on the basis of the oxidation-reduction potential $E_{CA}$ of the catalyst included in the cathode electrode 16. When the electrolytic bath 2 is in the first state during the operation stop, the specified voltage may be determined on the basis of a difference between the oxidation-reduction potential $E_{AN}$ of the catalyst included in the anode electrode 12 and the oxidation-reduction potential of the reaction for hydrogenating the hydrogenation target substance with protons to generate the organic hydride. When the electrolytic bath 2 is in the second state during the operation stop, the specified voltage may be determined on the basis of a difference between the oxidation-reduction potential of the reaction for oxidizing water to generate protons and the oxidation-reduction potential $E_{CA}$ of the catalyst included in the cathode electrode 16. Alternatively, the specified voltage is determined on the basis of a larger one of a difference between the oxidation-reduction potential of the reaction for oxidizing water to generate protons and the oxidation-reduction potential $E_{CA}$ and a difference between the oxidation-reduction potential $E_{AN}$ and the oxidation-reduction potential of the reaction for hydrogenating the hydrogenation target substance with protons to generate the organic hydride. For example, a value of the difference is determined as the specified voltage.

It is possible to control whether the electrolytic bath 2 is in the first state or the second state during the operation stop of the organic hydride generation system 1, in other words, which one of the potentials of the anode electrode 12 and the cathode electrode 16 is changed during the operation stop. For example, the state taken by the electrolytic bath 2 during the operation stop of the organic hydride generation system 1 can be controlled by creating a state in which the sum of the charge amount of oxygen or hydrogen present in the electrode chamber of one electrode and the charge amount of the corresponding electrode is larger than the sum of the charge amount of hydrogen or oxygen present in the electrode chamber of the other electrode and the charge amount of the corresponding electrode. As a method for determining the state taken by the electrolytic bath 2 during the operation stop of the organic hydride generation system 1, that is, as a method for controlling the state of the electrolytic bath 2, the following methods are exemplified.

[First Control Method]

In the organic hydride generation system 1, the catholyte is circulated in the cathode chamber 18 during operation by the second circulation mechanism 8. When the catholyte is circulated in the cathode chamber 18, by-product hydrogen in the cathode chamber 18 is also discharged to the side of the second circulation tank 32 accordingly. As a result, the second circulation mechanism 8 functions as a discharge mechanism that discharges hydrogen in the cathode chamber 18.

Therefore, in the first control method, in a case where the electrolytic bath 2 is controlled to take the first state, when the operation of the organic hydride generation system 1 is shifted to stop, the supply of power is stopped after a predetermined time has elapsed since the circulation of the catholyte is suppressed. That is, the controller 10 stops the supply of power from the power supply 4 after a predetermined time has elapsed since the drive of the second circulation mechanism 8 is suppressed. Discharge of the hydrogen gas present in the cathode chamber 18 can be suppressed by suppressing the circulation of the catholyte to the cathode chamber 18 before stopping the supply of power. In addition, the amount of hydrogenation target substance present in the cathode chamber 18 can be reduced, and the progress of hydrogen generation as a side reaction can be promoted. As a result, the amount of hydrogen in the cathode chamber 18 can be increased. Therefore, a state in which the negative charge amount on the cathode side is larger than the positive charge amount on the anode side ($Q_{AN}$_electrode+ $Q_{AN}$_$O_2$<$Q_{CA}$_electrode+$Q_{CA}$_$H_2$) is created, and the electrolytic bath 2 can be brought into the first state.

The "suppression of circulation" means that the flow rate of the hydrogenation target substance (in other words, the discharge amount of hydrogen) is reduced to preferably $\frac{1}{100}$ or less, more preferably $\frac{1}{1000}$ or less of the flow rate during rated electrolysis, and that the flow rate is further preferably 0, that is, complete stop. In addition, the "predetermined time" can be set in advance on the basis of an experiment or simulation by a designer. For example, the predetermined time is a time required for the cathode chamber 18 to be filled with the hydrogen gas.

Further, in the first control method, in a case where the electrolytic bath 2 is controlled to take the second state, when the operation of the organic hydride generation system 1 is shifted to stop, the circulation of the catholyte is suppressed after a predetermined time has elapsed since the supply of power is stopped. That is, the controller 10 suppresses the drive of the second circulation mechanism 8 after a predetermined time has elapsed since the supply of power from the power supply 4 is stopped. By continuing the circulation of the catholyte to the cathode chamber 18 even after the supply of power is stopped, it is possible to promote the discharge of the hydrogen gas present in the cathode chamber 18. Therefore, the amount of hydrogen present in the cathode chamber 18 can be reduced. Therefore, a state in which the positive charge amount on the anode side is larger than the negative charge amount on the cathode side ($Q_{AN}$_electrode+$Q_{AN}$_$O_2$>$Q_{CA}$_electrode+

$Q_{CA\_H_2}$) is created, and the electrolytic bath 2 can be brought into the second state. The "suppression of circulation" and the "predetermined time" are defined in the same manner as described above. For example, the predetermined time is a time required for the cathode chamber 18 to be filled with the catholyte.

The organic hydride generation system 1 may include a mechanism other than the second circulation mechanism 8 as a discharge mechanism for discharging hydrogen in the cathode chamber 18. For example, the organic hydride generation system 1 may include, as the discharge mechanism, a gas circulation mechanism 40 that circulates inert gas such as nitrogen or oxidizing gas in the cathode chamber 18. In this case, hydrogen in the cathode chamber 18 is discharged by circulating the inert gas or the like in the cathode chamber 18 by the gas circulation mechanism 40, and the amount of remaining hydrogen in the cathode chamber 18 can be reduced. The oxidizing gas is a substance having an oxidation action on the cathode catalyst, and is, for example, air or oxygen.

For example, the gas circulation mechanism 40 has a tank 42 of the inert gas or the oxidizing gas, a gas flow path 44 connecting the cathode chamber 18 and the tank 42, and an on-off valve 46 provided in the middle of the gas flow path 44. The on-off valve 46 is controlled by the controller 10. The controller 10 can switch between circulation and stop of the inert gas or the like from the tank 42 to the cathode chamber 18 by controlling the on-off valve 46. Hydrogen discharge by the circulation of the catholyte, the inert gas, or the oxidizing gas may be repeatedly performed during the operation stop. As a result, the electrolytic bath 2 can be maintained in the second state during the operation stop.

[Second Control Method]

In the organic hydride generation system 1, the anolyte is circulated in the anode chamber 14 during operation by the first circulation mechanism 6. When the anolyte is circulated in the anode chamber 14, oxygen in the anode chamber 14 is discharged to the side of the first circulation tank 26 accordingly. Therefore, the first circulation mechanism 6 functions as a discharge mechanism that discharges oxygen in the anode chamber 14.

Therefore, in the second control method, in a case where the electrolytic bath 2 is controlled to take the first state, the circulation of the anolyte is suppressed after a predetermined time has elapsed since the supply of power is stopped, when the operation of the organic hydride generation system 1 is shifted to the stop. That is, the controller 10 suppresses the drive of the first circulation mechanism 6 after a predetermined time has elapsed since the supply of power from the power supply 4 is stopped. By continuing the circulation of the anolyte to the anode chamber 14 even after the supply of power is stopped, the amount of oxygen present in the anode chamber 14 can be reduced. Therefore, a state in which the negative charge amount on the cathode side is sufficiently larger than the positive charge amount on the anode side ($Q_{AN\_}$electrode+$Q_{AN\_O_2}$<$Q_{CA\_}$electrode+$Q_{CA\_H_2}$) is created, and the electrolytic bath 2 can be brought into the first state.

The "suppression of circulation" means that the flow rate of the anolyte (in other words, the discharge amount of oxygen) is reduced to preferably 1/100 or less, more preferably 1/1000 or less of the flow rate during rated electrolysis, and that the flow rate is further preferably 0, that is, complete stop. In addition, the "predetermined time" can be set in advance on the basis of an experiment or simulation by a designer. For example, the predetermined time is a time required until all the oxygen gas in the anode chamber 14 is expelled to the side of the first circulation tank 26 and the anode chamber 14 is filled with the anolyte.

In addition, in the second control method, in a case where the electrolytic bath 2 is controlled to take the second state, the supply of power is stopped after a predetermined time has elapsed since the circulation of the anolyte to the anode chamber 14 is suppressed, when the operation of the organic hydride generation system 1 is shifted to the stop. That is, the controller 10 stops the supply of power from the power supply 4 after a predetermined time has elapsed since the drive of the first circulation mechanism 6 is suppressed. By suppressing the circulation of the anolyte to the anode chamber 14 before the stop of the supply of the power, the generation of the oxygen gas can be continued in a state where the discharge of the oxygen gas from the anode chamber 14 is suppressed. Therefore, the amount of oxygen present in the anode chamber 14 can be increased. Therefore, a state in which the positive charge amount on the anode side is larger than the negative charge amount on the cathode side ($Q_{AN\_}$electrode+$Q_{AN\_O_2}$>$Q_{CA\_}$electrode+$Q_{CA\_H_2}$) is created, and the electrolytic bath 2 can be brought into the second state. The "suppression of circulation" and the "predetermined time" are defined in the same manner as described above. For example, the predetermined time is a time required until the anode chamber 14 is filled with the oxygen gas.

The organic hydride generation system 1 may include a mechanism other than the first circulation mechanism 6 as a discharge mechanism that discharges oxygen in the anode chamber 14. For example, the organic hydride generation system 1 may include a gas circulation mechanism 48 for circulating inert gas such as nitrogen or reducing gas to the anode chamber 14 as the discharge mechanism. In this case, by circulating the inert gas or the like in the anode chamber 14 by the gas circulation mechanism 48, oxygen in the anode chamber 14 can be discharged to reduce the amount of remaining oxygen in the anode chamber 14. The reducing gas is a substance having a reduction action on the anode catalyst, and is, for example, hydrogen.

For example, the gas circulation mechanism 48 has a tank 50 for the inert gas or the reducing gas, a gas flow path 52 connecting the anode chamber 14 and the tank 50, and an on-off valve 54 provided in the middle of the gas flow path 52. The on-off valve 54 is controlled by the controller 10. The controller 10 can switch between circulation and stop of the inert gas or the like from the tank 50 to the anode chamber 14 by controlling the on-off valve 54. Oxygen discharge by the circulation of the anolyte, the inert gas, or the reducing gas may be repeatedly performed during the operation stop. As a result, the electrolytic bath 2 can be maintained in the first state during the operation stop.

[Third Control Method]

In a third control method, in a case where the electrolytic bath 2 is controlled to take the first state, hydrogen is supplied to the cathode chamber 18 when the operation of the organic hydride generation system 1 is stopped or during the operation stop. As a result, a state in which the negative charge amount on the cathode side is larger than the positive charge amount on the anode side is created, and the electrolytic bath 2 can be maintained in the first state. The supply of hydrogen to the cathode chamber 18 may be repeatedly performed during the operation stop.

In addition, in the third control method, in a case where the electrolytic bath 2 is controlled to take the second state, oxygen is supplied to the anode chamber 14 when the operation of the organic hydride generation system 1 is stopped or during the operation stop. As a result, a state in which the positive charge amount on the anode side is larger than the negative charge amount on the cathode side is created, and the electrolytic bath 2 can be brought into the second state. The supply of oxygen to the anode chamber 14 may be repeatedly performed during the operation stop. In addition, the supply of hydrogen to the cathode chamber 18 and the supply of oxygen to the anode chamber 14 may be switchable.

As a mechanism for supplying hydrogen to the cathode chamber 18, the above-described gas circulation mechanism 40 is exemplified. In this case, hydrogen gas is stored in the tank 42 instead of the inert gas or the oxidizing gas. The controller 10 can switch between circulation and stop of the hydrogen gas from the tank 42 to the cathode chamber 18 by controlling the on-off valve 46. As a mechanism for supplying oxygen to the anode chamber 14, the above-described gas circulation mechanism 48 is exemplified. In this case, oxygen gas is stored in the tank 50 instead of the inert gas or the reducing gas. The controller 10 can switch between circulation and stop of the oxygen gas from the tank 50 to the anode chamber 14 by controlling the on-off valve 54.

In addition, the mechanism for supplying hydrogen to the cathode chamber 18 may be a mechanism in which hydrogen is dissolved in the catholyte to be circulated in the cathode chamber 18 and the catholyte is circulated in the cathode chamber 18 by the second circulation mechanism 8. Similarly, the mechanism for supplying oxygen to the anode chamber 14 may be a mechanism in which oxygen is dissolved in the anolyte to be circulated in the anode chamber 14, and the anolyte is circulated in the anode chamber 14 by the first circulation mechanism 6. Note that the supply of hydrogen to the cathode chamber 18 and the supply of oxygen to the anode chamber 14 may be continued until the operation is restarted from a time point when the operation of the organic hydride generation system 1 is stopped, or may be stopped after a predetermined time elapses.

[Fourth Control Method]

In a fourth control method, when the electrolytic bath 2 is controlled to take the first state, the inside of the cathode chamber 18 is pressurized when the operation of the organic hydride generation system 1 is stopped or during the operation stop. Pressurizing the cathode chamber 18 can increase the amount of gaseous hydrogen present in the cathode chamber 18. As a result, a state in which the negative charge amount on the cathode side is larger than the positive charge amount on the anode side is created, and the electrolytic bath 2 can be brought into the first state. This method can be realized, for example, by the organic hydride generation system 1 including a known pressurization mechanism for pressurizing the inside of the cathode chamber 18 and the controller 10 controlling the pressurization mechanism. The pressurization in the cathode chamber 18 may be repeatedly performed during the operation stop.

In a case where the electrolytic bath 2 is controlled to take the second state, the inside of the anode chamber 14 is pressurized when the operation of the organic hydride generation system 1 is stopped or during the operation stop. Pressurizing the anode chamber 14 can increase the amount of gaseous oxygen present in the anode chamber 14. As a result, a state in which the positive charge amount on the anode side is larger than the negative charge amount on the cathode side is created, and the electrolytic bath 2 can be brought into the second state. This method can be realized, for example, by the organic hydride generation system 1 including a known pressurization mechanism for pressurizing the inside of the anode chamber 14 and the controller 10 controlling the pressurization mechanism. The pressurization in the anode chamber 14 may be repeatedly performed during the operation stop. In addition, the pressurization in the cathode chamber 18 and the pressurization in the anode chamber 14 may be switchable.

[Fifth Control Method]

In a fifth control method, when the electrolytic bath 2 is controlled to take the first state, the volume of the cathode chamber 18 is larger than the volume of the anode chamber 14. As a result, a state in which the negative charge amount on the cathode side is larger than the positive charge amount on the anode side is created, and the electrolytic bath 2 can be brought into the first state. When the electrolytic bath 2 is controlled to take the second state, the volume of the anode chamber 14 is larger than the volume of the cathode chamber 18. As a result, a state in which the positive charge amount on the anode side is sufficiently larger than the negative charge amount on the cathode side is created, and the electrolytic bath 2 can be brought into the second state.

[Sixth Control Method]

In a sixth control method, when the electrolytic bath 2 is controlled to take the first state, the cathode electrode 16 is caused to contain a material for increasing the electrode capacity such as carbon, and the electrode capacity of the cathode electrode 16 is caused to be larger than the electrode capacity of the anode electrode 12. As a result, a state in which the negative charge amount on the cathode side is larger than the positive charge amount on the anode side is created, and the electrolytic bath 2 can be brought into the first state. In addition, when the electrolytic bath 2 is controlled to take the second state, the anode electrode 12 is caused to contain a material for increasing the electrode capacity such as carbon, and the electrode capacity of the anode electrode 12 is caused to be larger than the electrode capacity of the cathode electrode 16. As a result, a state in which the positive charge amount on the anode side is larger than the negative charge amount on the cathode side is created, and the electrolytic bath 2 can be brought into the second state.

According to the first to fourth control methods described above, the state of the electrolytic bath 2 can be controlled by controlling the first circulation mechanism 6, the second circulation mechanism 8, the gas circulation mechanism 40, the gas circulation mechanism 48, and the like by the controller 10. In addition, according to the fifth and sixth control methods described above, the state of the electrolytic bath 2 can be controlled at the design stage of the organic hydride generation system 1. The first to sixth control methods can be appropriately combined with each other.

The fifth and sixth control methods are effective methods for determining the state of the electrolytic bath 2 at the beginning of the operation stop of the organic hydride generation system 1. On the other hand, the first to fourth control methods are effective methods for continuously determining the state of the electrolytic bath 2 not only at the beginning of the operation stop but also during the operation stop. According to the first to fourth control methods, it is also possible to switch between the first state and the second state of the electrolytic bath 2 at the time of each operation stop. As a case where such switching is effective, for example, the following cases can be considered. That is, for example, when it is grasped in advance that the degree of deterioration of the cathode catalyst is significant when the cathode catalyst is deteriorated, the electrolytic bath 2 is controlled to be in the first state when the operation is stopped as basic control. However, when the deterioration of the anode catalyst is confirmed during the operation of the organic hydride generation system 1, the electrolytic bath 2 is controlled to be in the second state at the time of subsequent operation stop. The deterioration of the catalyst can be determined from the color of the liquid in the circulation tank, the precipitation of the eluted catalyst, the stink of the liquid, and the like.

During the operation of the organic hydride generation system 1, the voltage or the potential is maintained at the electrolytic voltage or the electrolytic potential. Therefore, the stop of the operation of the organic hydride generation system 1 can be grasped on the basis of the decrease in voltage or the change in potential indicated by the result of the detector 38. For example, when the fifth or sixth control method is adopted, the controller 10 only needs to control the start timing of the potential recovery electrolysis on the basis of the detection result of the detector 38, and does not need to execute determination processing of the operation state of the organic hydride generation system 1.

On the other hand, in a case where the first to fourth control methods are adopted, for example, the controller 10 detects that the operation of the organic hydride generation system 1 is stopped by receiving a stop signal of the supply of power from the main power supplier 56. When the stop signal of the supply of power is received, the controller 10 controls the drive of the first circulation mechanism 6, the second circulation mechanism 8, the gas circulation mechanism 40, the gas circulation mechanism 48, the pressurization mechanism, and the like as necessary. The supply of power from the power supply 4 after receiving the stop signal of the supply of power from the main power supplier 56 can be covered by the power supplied before receiving the stop signal, or can be covered by the supply of power from the auxiliary power supplier 58 if not enough. Note that the controller 10, the first circulation mechanism 6, the second circulation mechanism 8, the gas circulation mechanism 40, the gas circulation mechanism 48, the pressurization mechanism, and the like are driven by another power supply not illustrated in the drawings.

Note that both the potential of the anode electrode 12 and the potential of the cathode electrode 16 may be detected by the detector 38. According to such a configuration, implementation of the above-described first to sixth control methods can be omitted. Therefore, the organic hydride generation system 1 can be simplified. When the potentials of both the electrodes are detected by the detector 38, the specified potential $E_{AN1}$ is determined on the basis of the oxidation-reduction potential $E_{AN}$, and the specified potential $E_{CA1}$ is determined on the basis of the oxidation-reduction potential $E_{CA}$.

The hydrogenation target substance such as toluene is more likely to be reduced in terms of the potential than hydrogen (that is, an equilibrium potential is in a nobler direction). Therefore, in the potential recovery electrolysis, it is preferable to apply an overvoltage to the electrolytic bath 2 so that the potential of the cathode electrode 16 is preferably 0 V (vs. RHE) or less, more preferably −0.025 V (vs. RHE) or less, and still more preferably −0.027 V (vs. RHE) or less. As a result, hydrogen can be more reliably generated at the cathode electrode 16, and a potential recovery effect can be obtained.

Further, in a case where the charge amount supplied to the anode side by the electrolysis in the electrolytic bath 2 caused by the supply of power from the auxiliary power supplier 58, that is, the potential recovery electrolysis during the operation stop is $Q_{AN}$, the charge amount supplied to the cathode side by the potential recovery electrolysis during the operation stop is $Q_{CA}$, the charge amount of oxygen in the anode chamber 14 storing the maximum amount of oxygen is $Q_{AN}\ O_2$ max, the charge amount of hydrogen in the cathode chamber 18 storing the maximum amount of hydrogen is $Q_{CA}\ H_2$ max, and a smaller one of $Q_{AN}\ O_2$ max+$Q_{AN}$ electrode and $Q_{CA}\ H_2$ max+$Q_{CA}$ electrode is Min Q total, when the electrolytic bath 2 is in the first state during the operation stop, the controller 10 executes electrolysis during the operation stop so that the charge amount $Q_{AN}$ satisfies $Q_{AN}$ electrode<$Q_{AN}$≤Min Q total. When the electrolytic bath 2 is in the second state during the operation stop, the controller 10 executes electrolysis during the operation stop so that the charge amount $Q_{CA}$ satisfies $Q_{CA}$ electrode<$Q_{CA}$≤Min Q total.

When the potential of the anode electrode 12 is recovered by electrolysis during the operation stop, a lower limit value of the charge amount $Q_{AN}$ supplied (provided) to the anode side by the electrolysis is preferably the charge amount $Q_{AN}$ electrode of the anode electrode 12. If the charges are not supplied so as to exceed the lower limit value, all the charges supplied by the electrolysis are consumed by the electrode capacitance, and oxygen cannot be generated in the anode electrode 12. For this reason, it is difficult to extend the maintenance time of the potential after the electrolysis. Therefore, by setting the lower limit value of the charge amount $Q_{AN}$ as described above, the potential recovery effect by the electrolysis can be more reliably obtained.

When the potential of the cathode electrode 16 is recovered by electrolysis during the operation stop, a lower limit value of the charge amount $Q_{CA}$ supplied to the cathode side by the electrolysis is preferably the charge amount $Q_{CA}$ electrode of the cathode electrode 16. If the charges are not supplied so as to exceed the lower limit value, all the charges supplied by the electrolysis are consumed by the electrode capacitance, and hydrogen cannot be generated in the cathode electrode 16. For this reason, it is difficult to extend the maintenance time of the potential after the electrolysis. Therefore, by setting the lower limit value of the charge amount $Q_{CA}$ as described above, the potential recovery effect by the electrolysis can be more reliably obtained.

An upper limit value of the charge amount $Q_{AN}$ supplied to the anode side and an upper limit value of the charge amount $Q_{CA}$ supplied to the cathode side by electrolysis during the operation stop are preferably a smaller one (Min Q total) of a total charge amount $Q_{AN}$ total of the charge amount $Q_{AN}\ O_2$ max of oxygen when the anode chamber 14 is filled with oxygen (the maximum value which the charge amount of oxygen present in the anode chamber 14 can take) and the charge amount $Q_{AN}$ electrode of the anode electrode 12, and a total charge amount $Q_{CA}$ total of the charge amount $Q_{CA}\ H_2$ max of hydrogen when the cathode chamber 18 is filled with hydrogen (the maximum value which the charge amount of hydrogen present in the cathode chamber 18 can take) and the charge amount $Q_{CA}$ electrode of the cathode electrode 16. This is because a maximum value of a coulomb amount at which the effect of the potential recovery electrolysis can be obtained is a coulomb amount in a state in which the side with the smaller electric capacity the anode side and the cathode side is full. By setting the upper limit values of the charge amount $Q_{AN}$ and the charge amount $Q_{CA}$ as described above, it is possible to suppress waste of power while maximizing the potential recovery effect by electrolysis.

For example, in a case where the total charge amount $Q_{AN}$ total on the anode side is smaller than the total charge amount $Q_{CA}$ total on the cathode side, even if electrolysis is performed so that charges exceeding the upper limit value are supplied to the anode side, oxygen generated by the electrolysis is expelled from the anode chamber 14. Therefore, this does not contribute to an increase in the charge amount on the anode side, and the maintenance time of the potential after electrolysis does not extend. In addition, in a case where the total charge amount $Q_{CA}$ total on the cathode side is smaller than the total charge amount $Q_{AN}$ total on the anode side, even if electrolysis is performed so that charges exceeding the upper limit value are supplied to the cathode side, hydrogen generated by the electrolysis is expelled from the cathode chamber 18. Therefore, this does not contribute to an increase in the charge amount on the cathode side, and the maintenance time of the potential after electrolysis does not extend.

The charge amount Q (unit: coulomb) is obtained by the product of the value of the current flowing through the electrolytic bath 2 at the time of electrolysis and the electrolysis time. Therefore, the controller 10 can detect that the charge amount $Q_{AN}$ satisfies $Q_{AN}$ electrode<$Q_{AN}$≤Min Q total and that the charge amount $Q_{CA}$ satisfies $Q_{CA}$ electrode<$Q_{CA}$≤Min Q total, on the basis of the current value and the elapsed time in electrolysis.

Figure 2:
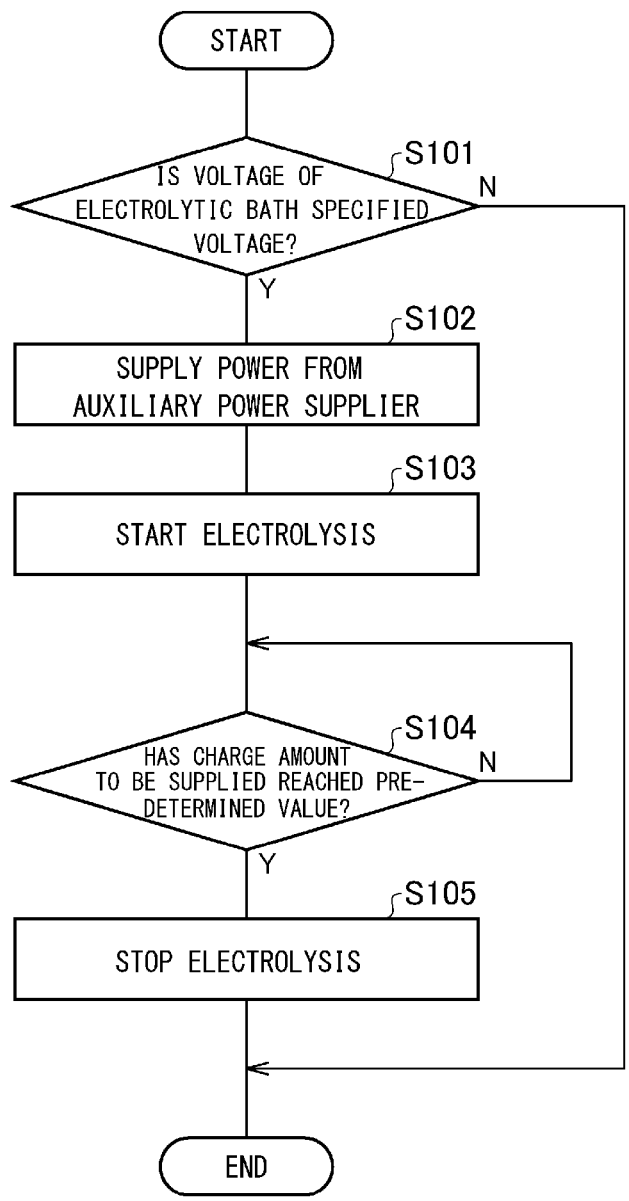
FIG. 2 is a flowchart of control executed by the organic hydride generation system.

Hereinafter, an example of control executed by the organic hydride generation system 1 will be described. FIG. 2 is a flowchart of control executed by the organic hydride generation system 1. This control flow is repeatedly executed by the controller 10 at predetermined timing. Note that FIG. 2 illustrates a case where the detector 38 detects the voltage of the electrolytic bath 2.

First, the controller 10 determines whether or not the voltage of the electrolytic bath 2 has decreased to a specified voltage, on the basis of a detection result of the detector 38 (S101). When the voltage does not decrease to the specified voltage (N in S101), the controller 10 ends the present routine. When the voltage decreases to the specified voltage (Y in S101), the controller 10 controls the auxiliary power supplier 58 so as to supply power to the power supply 4 (S102). Subsequently, the controller 10 controls the power supply 4 so as to supply power to the electrolytic bath 2, and starts electrolysis in the electrolytic bath 2 (S103).

The controller 10 determines whether or not the charge amount supplied to the electrolytic bath 2 by electrolysis has reached a predetermined value, on the basis of the current value at the time of electrolysis and the elapsed time (S104). As described above, the predetermined value of the charge amount is a value that is larger than the charge amount of the electrode and is included in a range equal to or smaller than the sum (smaller one of the anode side and the cathode side) of the maximum charge amount of the gas in the electrode chamber and the charge amount of the electrode. When the charge amount does not reach the predetermined value (N in S104), the controller 10 repeats the determination in step S104. When the charge amount reaches the predetermined value (Y in S104), the controller 10 stops the supply of power from the auxiliary power supplier 58 to stop the electrolysis in the electrolytic bath 2 (S105), and ends the present routine.

Note that, in the organic hydride generation system 1 described above, power is supplied from the main power supplier 56 and the auxiliary power supplier 58 to the common power supply 4, but the present invention is not particularly limited to this configuration. For example, a power supply may be individually provided for the main power supplier 56 and the auxiliary power supplier 58. Further, each of the main power supplier 56 and the auxiliary power supplier 58 may have a power supply function. In this case, an independent power supply can be omitted. In addition, the combination of the auxiliary power supplier 58 and the power supply can be configured by, for example, a charge supply mechanism in which a storage battery and a relay are combined. That is, when the auxiliary power supplier 58 is configured by a storage battery, it is only necessary to control ON and OFF of the auxiliary power supplier 58, so that the power supply can be omitted. In this case, ON/OFF of the relay is controlled by the controller 10.

As described above, the organic hydride generation system 1 according to the present embodiment includes the electrolytic bath 2, the main power supplier 56 that supplies power to the electrolytic bath 2, the auxiliary power supplier 58 that supplies power to the electrolytic bath 2 independently of the main power supplier 56, the detector 38 that detects the voltage between the anode electrode 12 and the cathode electrode 16 of the electrolytic bath 2, the potential of the anode electrode 12, or the potential of the cathode electrode 16, and the controller 10 that controls the supply of power to the electrolytic bath 2 on the basis of the detection result of the detector 38. When the detector 38 detects that the voltage has decreased to the specified voltage, the potential of the anode electrode 12 has changed to the specified potential $E_{AN1}$, or the potential of the cathode electrode 16 has changed to the specified potential $E_{CA1}$ during the operation stop of the organic hydride generation system 1 in which the power from the main power supplier 56 is not supplied to the electrolytic bath 2, the controller 10 controls the auxiliary power supplier 58 so as to supply the power to the electrolytic bath 2.

During the operation stop of the organic hydride generation system 1, the gas crossover or the reverse current may occur in the electrolytic bath 2. When the gas crossover or the reverse current occurs, the potential of the anode electrode 12 or the cathode electrode 16 changes from the potential at the time of electrolysis, and causes deterioration. When the deterioration of the electrode progresses, the electrolysis overvoltage in the electrolytic bath 2 increases, and the amount of power required for generating hydrogen of a unit mass increases. On the other hand, in the organic hydride generation system 1 according to the present embodiment, the voltage of the electrolytic bath 2 or the potential of one of the electrodes is monitored during the operation stop. When it is detected by the monitoring that the voltage or the potential has changed to a value that can cause electrode deterioration, the potential recovery electrolysis is performed using the power from the auxiliary power supplier 58. Therefore, deterioration of the electrode can be suppressed. As a result, the durability of the organic hydride generation system 1 can be improved, and the organic hydride can be produced with low power over a longer period.

In addition, when the charge amount of the anode electrode 12 is $Q_{AN}$ electrode, the charge amount of the cathode electrode 16 is $Q_{CA}$ electrode, the absolute value of the positive charge amount of oxygen present in the anode chamber 14 is $Q_{AN} O_2$, and the absolute value of the negative charge amount of hydrogen present in the cathode chamber 18 is $Q_{CA} H_2$, the electrolytic bath 2 is determined to take the first state in which $Q_{CA}$ electrode+$Q_{CA} H_2$ is larger than $Q_{AN}$ electrode+$Q_{AN} O_2$ or the second state in which $Q_{AN}$ electrode+$Q_{AN} O_2$ is larger than $Q_{CA}$ electrode+$Q_{CA} H_2$ during the operation stop. As a result, it is possible to control which electrode potential is changed during the operation stop of the organic hydride generation system 1.

In a case where when the electrolytic bath 2 is in the first state during the operation stop, the specified voltage is determined on the basis of the oxidation-reduction potential $E_{AN}$ when the catalyst included in the anode electrode 12 causes the reduction reaction accompanied by a phase change or a valence change, and in a case where the electrolytic bath 2 is in the second state during the operation stop, the specified voltage is determined on the basis of the oxidation-reduction potential $E_{CA}$ when the catalyst included in the cathode electrode 16 causes an oxidation reaction accompanied by a phase change or a valence change. As a result, it is possible to achieve both suppression of the electrode deterioration and suppression of power consumption by the potential recovery electrolysis.

In a case where the electrolytic bath 2 is in the first state during the operation stop, the specified voltage may be determined on the basis of a difference between the oxidation-reduction potential $E_{AN}$ when the catalyst included in the anode electrode 12 causes the reduction reaction accompanied by a phase change or a valence change and the oxidation-reduction potential of the reaction for hydrogenating a hydrogenation target substance with protons to generate an organic hydride, and in a case where the electrolytic bath 2 is in the second state during the operation stop, the specified voltage may be determined on the basis of a difference between the oxidation-reduction potential of the reaction for oxidizing water to generate protons and the oxidation-reduction potential $E_{CA}$ when the catalyst included in the cathode electrode 16 causes the oxidation reaction accompanied by a phase change or a valence change. When the first state or the second state of the electrolytic bath 2 can be identified only by the voltage detection of the electrolytic bath 2, the specified voltage can be determined as described above.

Alternatively, the specified voltage is determined on the basis of a larger one of a difference between the oxidation-reduction potential of the reaction for oxidizing water to generate protons and the oxidation-reduction potential $E_{CA}$ and a difference between the oxidation-reduction potential $E_{AN}$ and the oxidation-reduction potential of the reaction for hydrogenating the hydrogenation target substance with protons to generate the organic hydride. When the voltage of the electrolytic bath 2 decreases to a larger one of the two potential differences, the catalyst included in the electrode reaches the oxidation-reduction potential $E_{AN}$ or the oxidation-reduction potential $E_{CA}$ in the shortest time. Therefore, by setting the specified voltage as described above, it is possible to more reliably suppress the deterioration of the electrode. In addition, the specified voltage can be determined without controlling the electrolytic bath 2 to the first state or the second state.

In a case where the detector 38 detects the potential, the detector 38 detects the potential of the anode electrode 12 when the electrolytic bath 2 is in the first state during the operation stop, and detects the potential of the cathode electrode 16 when the electrolytic bath 2 is in the second state during the operation stop. When the detection target of the detector 38 is the anode electrode 12, the specified potential $E_{AN1}$ is determined on the basis of the oxidation-reduction potential $E_{AN}$ of the catalyst included in the anode electrode 12, and when the detection target of the detector 38 is the cathode electrode 16, the specified potential $E_{CA1}$ is determined on the basis of the oxidation-reduction potential $E_{CA}$ of the catalyst included in the cathode electrode 16. As a result, it is possible to achieve both suppression of the electrode deterioration and suppression of power consumption by the potential recovery electrolysis.

Alternatively, the detector 38 detects the potential of the anode electrode 12 and the potential of the cathode electrode 16, the specified potential $E_{AN1}$ is determined on the basis of the oxidation-reduction potential $E_{AN}$, and the specified potential $E_{CA1}$ is determined on the basis of the oxidation-reduction potential $E_{CA}$. As a result, the organic hydride generation system 1 can be simplified.

In addition, in a case where the charge amount supplied to the anode side by the potential recovery electrolysis during the operation stop is $Q_{AN}$, the charge amount supplied to the cathode side by the potential recovery electrolysis during the operation stop is $Q_{CA}$, the charge amount of oxygen in the anode chamber 14 storing the maximum amount of oxygen is $Q_{AN}$ $O_2$ max, the charge amount of hydrogen in the cathode chamber 18 storing the maximum amount of hydrogen is $Q_{CA}$ $H_2$ max, and a smaller one of $Q_{AN}$ $O_2$ max+$Q_{AN}$ electrode and $Q_{CA}$ $H_2$ max+$Q_{CA}$ electrode is Min Q total, when the electrolytic bath 2 is in the first state during the operation stop, the controller 10 executes electrolysis during the operation stop so that the charge amount $Q_{AN}$ satisfies $Q_{AN}$ electrode<$Q_{AN}$≤Min Q total. When the electrolytic bath 2 is in the second state during the operation stop, the controller 10 executes electrolysis during the operation stop so that the charge amount $Q_{CA}$ satisfies $Q_{CA}$ electrode<$Q_{CA}$≤Min Q total. As a result, it is possible to suppress power consumption while more reliably obtaining an effect of suppressing the deterioration of the electrode by the electrolysis during the operation stop. Note that the controller 10 may determine timing to stop the electrolysis on the basis of only the elapsed time from the start of the potential recovery electrolysis.

The embodiments of the present invention have been described in detail above. The above-described embodiments are merely specific examples for carrying out the present invention. The contents of the embodiments do not limit the technical scope of the present invention, and many design changes such as changes, additions, and removals of the components can be made without departing from the spirit of the invention defined in the claims. A new embodiment in which the design change has been made has the effect of each of the combined embodiments and modifications. In the above-described embodiment, the contents that can be changed in design are emphasized with notations such as "of the present embodiment" and "in the present embodiment", but the design change is allowed even in the contents not having such notations. Any combination of the above components is also effective as an aspect of the present invention.

The embodiments may be identified by items described below.

[Item 1]

An organic hydride generation system (1) including:

an electrolytic bath (2) having an anode electrode (12) for oxidizing water to generate protons, a cathode electrode (16) for hydrogenating a hydrogenation target substance with the protons to generate an organic hydride, an anode chamber (14) accommodating the anode electrode (12), a cathode chamber (18) accommodating the cathode electrode (16), and a diaphragm (20) partitioning the anode chamber (14) and the cathode chamber (18);

a main power supplier (56) structured to supply power to the electrolytic bath (2);

an auxiliary power supplier (58) structured to supply power to the electrolytic bath (2) independently of the main power supplier (56);

a detector (38) structured to detect a voltage between the anode electrode (12) and the cathode electrode (16), a potential of the anode electrode (12), or a potential of the cathode electrode (16); and a controller (10) structured to control the supply of power to the electrolytic bath (2) on the basis of a detection result of the detector (38), wherein the controller (10) controls the auxiliary power supplier (58) so as to supply the power to the electrolytic bath (2), when it is detected that the voltage has decreased to a specified voltage, the potential of the anode electrode (12) has changed to a specified potential $E_{AN1}$, or the potential of the cathode electrode (16) has changed to a specified potential $E_{CA1}$ during operation stop of the organic hydride generation system (1) in which the power from the main power supplier (56) is not supplied to the electrolytic bath (2).

[Item 2]

A control device (10) for an organic hydride generation system (1), which includes an electrolytic bath (2) having an anode electrode (12) for oxidizing water to generate protons, a cathode electrode (16) for hydrogenating a hydrogenation target substance with the protons to generate an organic hydride, an anode chamber (14) accommodating the anode electrode (12), a cathode chamber (18) accommodating the cathode electrode (16), and a diaphragm (20) partitioning the anode chamber (14) and the cathode chamber (18) and in which power is supplied from a main power supplier (56) and an auxiliary power supplier (58) supplying the power independently of the main power supplier (56) to the electrolytic bath (2), wherein the control device (10) controls the auxiliary power supplier (58) so as to supply the power to the electrolytic bath (2), when it is detected that a voltage between the anode electrode (12) and the cathode electrode (16) has decreased to a specified voltage, a potential of the anode electrode (12) has changed to a specified potential $E_{AN1}$, or a potential of the cathode electrode (16) has changed to a specified potential $E_{CA1}$ during operation stop of the organic hydride generation system (1) in which the power from the main power supplier (56) is not supplied to the electrolytic bath (2).

[Item 3]

A control method for an organic hydride generation system (1), which includes an electrolytic bath (2) having an anode electrode (12) for oxidizing water to generate protons, a cathode electrode (16) for hydrogenating a hydrogenation target substance with the protons to generate an organic hydride, an anode chamber (14) accommodating the anode electrode (12), a cathode chamber (18) accommodating the cathode electrode (16), and a diaphragm (20) partitioning the anode chamber (14) and the cathode chamber (18) and in which power is supplied from a main power supplier (56) and an auxiliary power supplier (58) supplying the power independently of the main power supplier (56) to the electrolytic bath (2), the control method comprising:

detecting a voltage between the anode electrode (12) and the cathode electrode (16), a potential of the anode electrode (12), or a potential of the cathode electrode (16); and controlling the auxiliary power supplier (58) so as to supply the power to the electrolytic bath (2), when it is detected that a voltage has decreased to a specified voltage, a potential of the anode electrode has changed to a specified potential $E_{AN1}$, or a potential of the cathode electrode has changed to a specified potential $E_{CA1}$ during operation stop of the organic hydride generation system (1) in which the power from the main power supplier (56) is not supplied to the electrolytic bath (2).

EXAMPLES

Hereinafter, examples of the present invention will be described, but these examples are merely examples for suitably describing the present invention, and do not limit the present invention at all.

[Evaluation of Effectiveness of Potential Recovery Electrolysis]

Example 1

First, an electrolytic bath including an anode electrode (geometric area: 100 cm$^2$) made of iridium oxide (IrO$_2$), an anode chamber (volume: 40 mL), a cathode electrode (geometric area: 100 cm$^2$) made of platinum ruthenium supported carbon (Pt·Ru/C), a cathode chamber (volume: 10 mL), and a reference electrode (standard hydrogen electrode) inserted into the cathode chamber was prepared. Then, using this electrolytic bath, an electrolysis test was performed at a current density of 0.2 A/cm$^2$. During the electrolysis, the entire electrolytic bath was kept at 60° C., a 1 M sulfuric acid aqueous solution was circulated through the anode chamber at a flow rate of 20 ccm (cc/min), and toluene was circulated through the cathode chamber at a flow rate of 20 ccm. At this time, an anode potential was 1.6 V vs. RHE, a cathode potential was 0 V vs. RHE, and a voltage (cell voltage) of the electrolytic bath was 1.6 V.

Figure 3:
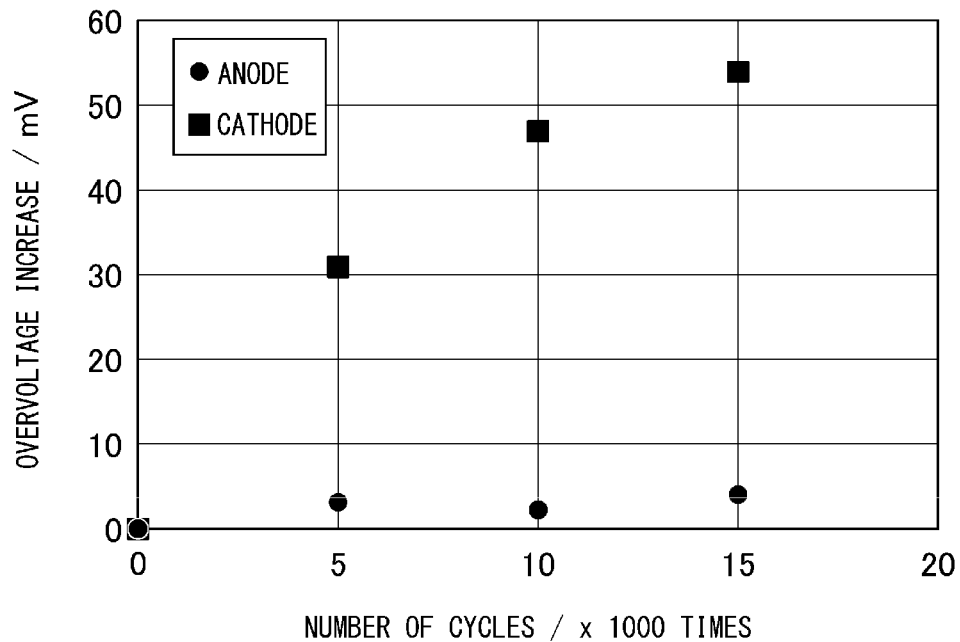
FIG. 3 is a diagram illustrating a potential change of each electrode by a potential cycle test.

Next, a potential cycle test was performed on the anode electrode of the electrolytic bath. Specifically, using an electrochemical evaluation device (potentiostat device: HZ-7000 manufactured by HOKUTO DENKO CORPORATION), a potential cycle test of 5000 cycles, 10000 cycles, and 15000 cycles was performed with a potential range as 0 to 1.6 V vs. RHE with reference to the reference electrode and a sweep rate as 1 V/sec. During the test, the entire electrolytic bath was kept at 40° C., a 1 M sulfuric acid aqueous solution was circulated through the anode chamber at a flow rate of 20 ccm, and toluene was circulated through the cathode chamber at a flow rate of 20 ccm. After performing the potential cycle test, the electrolysis test was performed again at a current density of 0.2 A/cm$^2$, and the amount of increase in overvoltage was measured using a data recording device (LR8400 manufactured by HIOKI E.E. CORPORATION). The results are illustrated in FIG. 3. FIG. 3 is a diagram illustrating a potential change of each electrode by the potential cycle test. As illustrated in FIG. 3, as the result of the potential cycle test on the anode electrode (anode), the voltage of the electrolytic bath was increased by 3 mV at 5000 cycles, was increased by 2 mV at 10000 cycles, and was increased by 4 mV at 15000 cycles.

In addition, the same potential cycle test as the test on the anode electrode described above was performed on the cathode electrode of the electrolytic bath. After performing the potential cycle test, the electrolysis test was performed again at a current density of 0.2 A/cm$^2$, and the amount of increase in overvoltage was measured using a data recording device (LR8400 manufactured by HIOKI E.E. CORPORATION). The results are illustrated in FIG. 3. As illustrated in FIG. 3, as the result of the potential cycle test on the cathode electrode (cathode), the voltage of the electrolytic bath was increased by 31 mV at 5000 cycles, was increased by 47 mV at 10000 cycles, and was increased by 54 mV at 15000 cycles.

In addition, the electrode capacity of each electrode used in the electrolytic bath was measured using an electrochemical evaluation device (HZ-7000 manufactured by HOKUTO DENKO CORPORATION). Specifically, a three-electrode electrolytic bath was prepared in which a working electrode was an anode electrode or a cathode electrode, a reference electrode was an Ag/AgCl electrode, and a counter electrode was a platinum wire. In addition, a 1 M sulfuric acid aqueous solution (normal temperature) degassed with nitrogen was prepared as an electrolyte. Then, for the anode electrode, rated electrolysis was performed at a current density of 0.2 A/cm$^2$ for 5 minutes to generate oxygen. Thereafter, the anode electrode was reduced at a current density of −0.5 mA/cm$^2$, and a relation between the electricity amount and the potential was measured. For the cathode electrode, rated electrolysis was performed at a current density of −0.2 A/cm$^2$ for 5 minutes to generate hydrogen. Thereafter, the cathode electrode was oxidized at a current density of 0.5 mA/cm$^2$, and the relation between the electricity amount and the potential was measured. The results are illustrated in FIG. 4.

Figure 4:
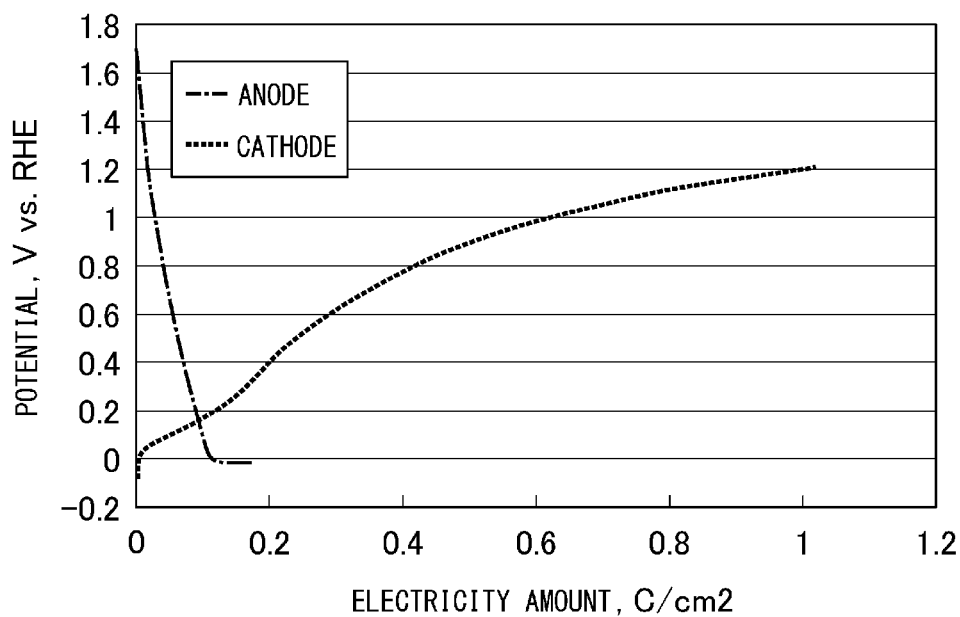
FIG. 4 is a diagram illustrating a relation between an electricity amount and a potential of each electrode.

FIG. 4 is a diagram illustrating a relation between an electricity amount and a potential of each electrode. FIG. 4 illustrates an electrode potential at each reduction electricity amount when the anode electrode (anode) is reduced by the reverse current or the cross leakage, and an electrode potential at each oxidation electricity amount when the cathode electrode (cathode) is oxidized. As illustrated in FIG. 4, the electricity amount when the potential of the anode electrode reaches the potential (potential of dissolved hydrogen: 0 V vs. RHE) immediately after stop of the electrolysis of the cathode electrode was 11 C (0.11 C per unit area). In addition, the electricity amount when the potential of the cathode electrode reaches the potential (potential of dissolved oxygen: 1.2 V vs. RHE) immediately after stop of the electrolysis of the anode electrode was 100 C (1 C per unit area).

From the results of the above-described potential cycle test, it was confirmed that the potential of the cathode electrode was more likely to change than that of the anode electrode, and the deterioration rate was higher. The deterioration rate is a value (unit: V/cycle) obtained by dividing the amount of change in voltage at the time of rated electrolysis before and after a predetermined potential cycle test when the potential cycle test is performed on the electrode by the number of cycles. Therefore, in the electrolytic bath, it is desirable to control the potential change of the cathode electrode to be suppressed during the electrolysis stop.

Therefore, a deterioration acceleration test was performed by the following procedure using this electrolytic bath. That is, a potential cycle test of 4000 cycles was performed with the potential range of the cathode electrode as 0.05 to 0.7 V vs. RHE with reference to the reference electrode and the sweep rate as 500 mV/sec. During the test, the entire electrolytic bath was kept at 60° C., a 1 M sulfuric acid aqueous solution was circulated through the anode chamber at a flow rate of 20 ccm, and toluene was circulated through the cathode chamber at a flow rate of 20 ccm. The upper limit potential of 0.7 V in the potential cycle corresponds to the potential of the phase change region of ruthenium used for the cathode catalyst. The phase change region is a numerical value generally derived from a phase diagram. That is, the deterioration acceleration test corresponds to an experimental plot in which the potential recovery electrolysis is repeatedly executed during the operation stop of the organic hydride generation system.

After performing the deterioration acceleration test, electrolysis was performed at a current density of 0.2 A/cm$^2$. Then, the voltage of the electrolytic bath was measured using a data recording device (LR8400 manufactured by HIOKI E.E. CORPORATION). As a result, the voltage of the electrolytic bath was 1.6001 V. Therefore, the amount of increase in the voltage of the electrolytic bath before and after the deterioration acceleration test was 0.1 mV.

Comparative Example 1

Using the same electrolytic bath as used in Example 1, the deterioration acceleration test was performed according to the following procedure. That is, a potential cycle test of 4000 cycles was performed with the potential range of the cathode electrode as 0.05 to 1.2 V vs. RHE with reference to the reference electrode and the sweep rate as 500 mV/sec. During the test, the entire electrolytic bath was kept at 60° C., a 1 M sulfuric acid aqueous solution was circulated through the anode chamber at a flow rate of 20 ccm, and toluene was circulated through the cathode chamber at a flow rate of 20 ccm. The upper limit potential of 1.2 V in the potential cycle corresponds to the potential immediately after stop of the electrolysis of the anode electrode in the conventional electrolysis, and is an upper limit value which the potential of the cathode electrode can reach when the potential change of the anode electrode is reduced to a negligible extent. That is, the deterioration acceleration test corresponds to a check plot in which the potential recovery electrolysis is not performed during the operation stop of the organic hydride generation system.

After performing the deterioration acceleration test, electrolysis was performed at a current density of 0.2 A/cm$^2$. Then, the voltage of the electrolytic bath was measured using a data recording device (LR8400 manufactured by HIOKI E.E. CORPORATION). As a result, the voltage of the electrolytic bath was 1.620 V. Therefore, the amount of increase in the voltage of the electrolytic bath before and after the deterioration acceleration test was 20 mV.

From the above results, it was confirmed that the increase in the voltage of the electrolytic bath can be suppressed by repeating the control of monitoring the potential increase of the cathode electrode during the operation stop of the organic hydride generation system and performing the potential recovery electrolysis when the potential of the cathode electrode reaches a predetermined potential. From the above results, it can be understood that, when the potential of the anode electrode changes during the operation stop of the organic hydride generation system, an increase in the voltage of the electrolytic bath can be suppressed by monitoring the potential decrease of the anode electrode and performing the potential recovery electrolysis when the potential reaches the predetermined potential.

[Verification of Supplied Charge Amount in Potential Recovery Electrolysis]

When the charge amount Q supplied to each electrode by the potential recovery electrolysis is larger, a time for which the potential of the electrode can be maintained at the potential at which deterioration is suppressed by one potential recovery electrolysis becomes longer, and it is assumed that the potential recovery effect is large. Therefore, the potential recovery effect when the supplied charge amount Q was changed was verified by the following Examples 2 to 4.

Example 2

Using the same electrolytic bath as used in Example 1, rated electrolysis and potential recovery electrolysis after electrolysis stop were performed in the following procedures. First, the rated electrolysis was performed at a current density of 0.2 A/cm$^2$ and an electrolytic bath temperature of 60° C. for 15 minutes. During the rated electrolysis, a 1 M sulfuric acid aqueous solution was circulated through the anode chamber at a flow rate of 20 ccm, and toluene was circulated through the cathode chamber at a flow rate of 20 ccm. At this time, the anode potential was 1.6 V vs. RHE, the cathode potential was 0 V vs. RHE, and the voltage of the electrolytic bath was 1.6 V.

In addition, the potential of the cathode electrode after the rated electrolysis was measured using a data recording device (LR8400 manufactured by HIOKI E.E. CORPORATION). When the cathode potential increases to 0.7 V vs. RHE, the potential recovery electrolysis was performed. In the potential recovery electrolysis, an electrolytic current was 20 A and an electrolysis time was 1 second. Therefore, the charge amount supplied to the electrolytic bath by the potential recovery electrolysis is 20 C. The cathode potential was reduced to 0 V by the potential recovery electrolysis. Thereafter, the cathode potential started to rise, and reached 0.7 V again when 2 minutes and 48 seconds elapsed from the end of the potential recovery electrolysis.

Example 3

The rated electrolysis and the potential recovery electrolysis were performed by the same operation as that in Example 2, except that the electrolysis time in the potential recovery electrolysis was 5 seconds and the supplied charge amount was 100 C. In Example 3, when 5 minutes and 58 seconds elapsed from the end of the potential recovery electrolysis, the potential reached 0.7 V again. Therefore, from the comparison between Example 2 and Example 3, it was confirmed that the state in which the deterioration of the cathode electrode does not progress can be maintained for a longer time by the increase in the supplied charge amount Q.

Example 4

The rated electrolysis and the potential recovery electrolysis were performed by the same operation as that in Example 2, except that the electrolytic current in the potential recovery electrolysis was 100 A, the electrolysis time was 1 second, and the supplied charge amount was 100 C. In Example 4, the potential reached 0.7 V again when 8 minutes and 25 seconds elapsed from the end of the potential recovery electrolysis. Therefore, from the comparison between Example 2 and Example 4, it was confirmed that the state in which the deterioration of the cathode electrode does not progress can be maintained for a longer time by the increase in the supplied charge amount Q.

In addition, from the comparison between Example 3 and Example 4, it was confirmed that a higher potential recovery effect can be obtained as the current density (ratio of the current value to the electrode area) is larger even when the supplied charge amount is the same. This is considered to be due to the following reason. That is, examples of the reaction occurring at the cathode electrode include recovery (charge) of the electrode capacity, hydrogen generation, and toluene reduction. Among them, the reaction contributing to the potential decrease of the cathode electrode is the recovery of the electrode capacity and the hydrogen generation. In addition, as the current density is higher, the overvoltage increases, and the ratio of the hydrogen generation to the toluene reduction increases. Therefore, it is considered that a higher potential recovery effect was obtained in Example 4 having a higher current density than Example 3.

[Verification of Cross Leakage Suppression]

According to the potential recovery electrolysis for the cathode electrode, an increase in the cathode electrode can be suppressed by generating hydrogen gas at the cathode electrode. On the other hand, when the potential recovery electrolysis is performed, oxygen gas is generated at the anode electrode. The oxygen gas suppresses a decrease in the potential of the anode electrode on the anode side, but increases the potential of the cathode electrode at the time of moving to the cathode side due to the cross leakage. As a result, the potential recovery effect on the cathode electrode is weakened. Therefore, the effect of suppressing the cross leakage of the oxygen gas generated at the anode electrode was verified by the following Example 5.

Example 5

Rated electrolysis and potential recovery electrolysis were performed by the same operation as that in Example 4, except that, after performing the potential recovery electrolysis, a sulfuric acid aqueous solution was circulated through the anode chamber to discharge oxygen in the anode chamber. In Example 5, the potential reached 0.7 V again when 9 minutes and 5 seconds elapsed from the end of the potential recovery electrolysis. Therefore, from the comparison between Example 4 and Example 5, it was confirmed that a state in which the deterioration of the cathode electrode does not progress can be maintained for a longer time by discharging oxygen generated on the anode side by the potential recovery electrolysis to the outside of the anode chamber. Note that the method for discharging oxygen in the anode chamber may be, for example, the circulation of the inert gas or the reducing gas described in the above-described control method 2.

Hydrogen is generated by the side reaction at the cathode electrode, but oxygen is generated by the main reaction at the anode electrode. Therefore, oxygen is more likely to be generated than hydrogen. Therefore, the amount of oxygen generated on the anode side tends to be excessive, and the decrease in the potential recovery effect due to the cross leakage of oxygen gas from the anode side is more remarkable than the decrease in the potential recovery effect due to the cross leakage of hydrogen gas from the cathode side.

What is claimed is:

1. An organic hydride generation system comprising:
    an electrolytic bath having an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber;
    a main power supplier structured to supply power to the electrolytic bath;
    an auxiliary power supplier structured to supply power to the electrolytic bath independently of the main power supplier;
    a detector structured to detect a voltage between the anode electrode and the cathode electrode, a potential of the anode electrode, or a potential of the cathode electrode; and
    a controller structured to control the supply of power to the electrolytic bath on the basis of a detection result of the detector,
    wherein the controller controls the auxiliary power supplier so as to supply the power to the electrolytic bath when it is detected that the voltage has decreased to a specified voltage, the potential of the anode electrode has changed to a specified potential $E_{AN1}$, or the potential of the cathode electrode has changed to a specified potential $E_{CA1}$ during operation stop of the organic hydride generation system in which the power from the main power supplier is not supplied to the electrolytic bath.

2. The organic hydride generation system according to claim 1, wherein when a charge amount of the anode electrode is $Q_{AN}$ electrode, a charge amount of the cathode electrode is $Q_{CA}$ electrode, an absolute value of a positive charge amount of oxygen present in the anode chamber is $Q_{AN}$ O2, and an absolute value of a negative charge amount of hydrogen present in the cathode chamber is $Q_{CA}$ H2, the electrolytic bath is determined to take a first state in which $Q_{CA}$ electrode+$Q_{CA}$ H2 is larger than $Q_{AN}$ electrode+$Q_{AN}$ O2 or a second state in which $Q_{AN}$ electrode+$Q_{AN}$ O2 is larger than $Q_{CA}$ electrode+$Q_{CA}$ H2 during operation stop, in a case where the electrolytic bath is in the first state during the operation stop, the specified voltage is determined on the basis of an oxidation-reduction potential $E_{AN}$ when a catalyst included in the anode electrode causes a reduction reaction accompanied by a phase change or a valence change, and in a case where the electrolytic bath is in the second state during the operation stop, the specified voltage is determined on the basis of an oxidation-reduction potential $E_{CA}$ when a catalyst included in the cathode electrode causes an oxidation reaction accompanied by a phase change or a valence change.

3. The organic hydride generation system according to claim 1, wherein when a charge amount of the anode electrode is $Q_{AN}$ electrode, a charge amount of the cathode electrode is $Q_{CA}$ electrode, an absolute value of a positive charge amount of oxygen present in the anode chamber is $Q_{AN}$ O2, and an absolute value of a negative charge amount of hydrogen present in the cathode chamber is $Q_{CA}$ H2, the electrolytic bath is determined to take a first state in which $Q_{CA}$ electrode+$Q_{CA}$ H2 is larger than $Q_{AN}$ electrode+$Q_{AN}$ O2 or a second state in which $Q_{AN}$ electrode+$Q_{AN}$ O2 is larger than $Q_{CA}$ electrode+$Q_{CA}$ H2 during operation stop, in a case where the electrolytic bath is in the first state during the operation stop, the specified voltage is determined on the basis of a difference between an oxidation-reduction potential $E_{AN}$ when a catalyst included in the anode electrode causes a reduction reaction accompanied by a phase change or a valence change and an oxidation-reduction potential of a reaction for hydrogenating a hydrogenation target substance with protons to generate an organic hydride, and in a case where the electrolytic bath is in the second state during the operation stop, the specified voltage is determined on the basis of a difference between an oxidation-reduction potential of a reaction for oxidizing water to generate protons and an oxidation-reduction potential $E_{CA}$ when a catalyst included in the cathode electrode causes an oxidation reaction accompanied by a phase change or a valence change.

4. The organic hydride generation system according to claim 1, wherein the specified voltage is determined on the basis of a larger one of a difference between an oxidation-reduction potential of a reaction for oxidizing water to generate protons and an oxidation-reduction potential $E_{CA}$ when a catalyst included in the cathode electrode causes an oxidation reaction accompanied by a phase change or a valence change, and a difference between an oxidation-reduction potential $E_{AN}$ when a catalyst included in the anode electrode causes a reduction reaction accompanied by a phase change or a valence change and an oxidation-reduction potential of a reaction for hydrogenating a hydrogenation target substance with protons to generate an organic hydride.

5. The organic hydride generation system according to claim 1, wherein when a charge amount of the anode electrode is $Q_{AN}$ electrode, a charge amount of the cathode electrode is $Q_{CA}$ electrode, an absolute value of a positive charge amount of oxygen present in the anode chamber is $Q_{AN}$ O2, and an absolute value of a negative charge amount of hydrogen present in the cathode chamber is $Q_{CA}$ H2, the electrolytic bath is determined to take a first state in which $Q_{CA}$ electrode+$Q_{CA}$ H2 is larger than $Q_{AN}$ electrode+$Q_{AN}$ O2 or a second state in which $Q_{AN}$ electrode+$Q_{AN}$ O2 is larger than $Q_{CA}$ electrode+$Q_{CA}$ H2 during operation stop, in case where the detector detects a potential, the detector detects a potential of the anode electrode when the electrolytic bath is in the first state during the operation stop, and detects a potential of the cathode electrode when the electrolytic bath is in the second state during the operation stop, and in a case where a detection target of the detector is the anode electrode, the specified potential $E_{AN1}$ is determined on the basis of an oxidation-reduction potential $E_{AN}$ when a catalyst included in the anode electrode causes a reduction reaction accompanied by a phase change or a valence change, and in a case where the detection target of the detector is the cathode electrode, the specified potential $E_{CA1}$ is determined on the basis of an oxidation-reduction potential $E_{CA}$ when a catalyst included in the cathode electrode causes an oxidation reaction accompanied by a phase change or a valence change.

6. The organic hydride generation system according to claim 1, wherein the detector detects a potential of the anode electrode and a potential of the cathode electrode, the specified potential $E_{AN1}$ is determined on the basis of an oxidation-reduction potential $E_{AN}$ when a catalyst included in the anode electrode causes a reduction reaction accompanied by a phase change or a valence change, and the specified potential $E_{CA1}$ is determined on the basis of an oxidation-reduction potential $E_{CA}$ when a catalyst included in the cathode electrode causes an oxidation reaction accompanied by a phase change or a valence change.

7. The organic hydride generation system according to claim 1, wherein when a charge amount of the anode electrode is $Q_{AN}$ electrode, a charge amount of the cathode electrode is $Q_{CA}$ electrode, an absolute value of a positive charge amount of oxygen present in the anode chamber is $Q_{AN}$ O2, and an absolute value of a negative charge amount of hydrogen present in the cathode chamber is $Q_{CA}$ H2, the electrolytic bath is determined to take a first state in which $Q_{CA}$ electrode+$Q_{CA}$ H2 is larger than $Q_{AN}$ electrode+$Q_{AN}$ O2 or a second state in which $Q_{AN}$ electrode+$Q_{AN}$ O2 is larger than $Q_{CA}$ electrode+$Q_{CA}$ H2 during operation stop, in a case where a charge amount supplied to the anode side by electrolysis in the electrolytic bath caused by power supply from the auxiliary power supplier is $Q_{AN}$, a charge amount supplied to the cathode side by the electrolysis is $Q_{CA}$, a charge amount of oxygen in the anode chamber storing a maximum amount of oxygen is $Q_{AN}$ O2 max, a charge amount of hydrogen in the cathode chamber storing a maximum amount of hydrogen is $Q_{CA}$ H2 max, and a smaller one of $Q_{AN}$ O2 max+$Q_{AN}$ electrode and QGA $Q_{CA}$ H2 max+$Q_{CA}$ electrode is Min Q total, when the electrolytic bath is in the first state during the operation stop, the controller executes electrolysis during the operation stop so that a charge amount $Q_{AN}$ satisfies $Q_{AN}$ electrode<$Q_{AN}$≤Min Q total, and when the electrolytic bath is in the second state during the operation stop, the controller executes electrolysis during the operation stop so that the charge amount $Q_{CA}$ satisfies $Q_{CA}$ electrode<$Q_{CA}$≤Min Q total.

8. The organic hydride generation system according to claim 1, wherein the diaphragm includes a solid polymer electrolyte membrane.

9. A control device for an organic hydride generation system, which includes an electrolytic bath having an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber and in which power is supplied from a main power supplier and an auxiliary power supplier supplying the power independently of the main power supplier to the electrolytic bath, wherein the control device controls the auxiliary power supplier so as to supply the power to the electrolytic bath, when it is detected that a voltage between the anode electrode and the cathode electrode has decreased to a specified voltage, a potential of the anode electrode has changed to a specified potential $E_{AN1}$, or a potential of the cathode electrode has changed to a specified potential $E_{CA1}$ during operation stop of the organic hydride generation system in which the power from the main power supplier is not supplied to the electrolytic bath.

10. A control method for an organic hydride generation system, which includes an electrolytic bath having an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber and in which power is supplied from a main power supplier and an auxiliary power supplier supplying the power independently of the main power supplier to the electrolytic bath, the control method comprising:

detecting a voltage between the anode electrode and the cathode electrode, a potential of the anode electrode, or a potential of the cathode electrode; and controlling the auxiliary power supplier so as to supply the power to the electrolytic bath, when it is detected that the voltage has decreased to a specified voltage, the potential of the anode electrode has changed to a specified potential $E_{AN1}$, or the potential of the cathode electrode has changed to a specified potential $E_{CA1}$ during operation stop of the organic hydride generation system in which the power from the main power supplier is not supplied to the electrolytic bath.

* * * * *